(12) United States Patent
Zakai et al.

(10) Patent No.: US 6,394,412 B2
(45) Date of Patent: May 28, 2002

(54) CONTROLLED VALVE

(75) Inventors: Avi Zakai, Reshon-LeZion; Youval Katzman, Zichron Yaacov; Vladimir Ryabtsev, Herzelia, all of (IL)

(73) Assignee: Netafim (A.C.S.) Ltd. (IL)

( * ) Notice: Subject to any disclaimer, the term of this patent is extended or adjusted under 35 U.S.C. 154(b) by 0 days.

(21) Appl. No.: 09/392,796

(22) Filed: Sep. 9, 1999

Related U.S. Application Data

(63) Continuation-in-part of application No. 08/567,073, filed on Dec. 4, 1995, now abandoned, which is a continuation-in-part of application No. 08/215,282, filed on Mar. 21, 1994, now abandoned.

(51) Int. Cl.⁷ ............................................. F16K 31/385
(52) U.S. Cl. .................. 251/30.02; 251/14; 251/46; 251/127; 251/129.03; 138/42; 137/487.5; 137/489
(58) Field of Search ............................ 251/30.01, 30.02, 251/300.05, 14, 331, 127, 25, 129.11, 129.03, 46; 137/110, 269, 487.5, 488, 489; 138/42

(56) References Cited

U.S. PATENT DOCUMENTS

| | | | |
|---|---|---|---|
| 1,933,713 A | 11/1933 | Cummings | 137/139 |
| 2,884,953 A | 5/1959 | McWilliams | 137/620 |
| 2,895,497 A * | 7/1959 | Jones | 251/331 X |
| 3,367,621 A * | 2/1968 | Griswold | 251/46 X |
| 3,368,413 A | 2/1968 | Vulliez | 74/55 |
| 3,646,958 A | 3/1972 | Braas | 137/553 |
| 3,991,788 A | 11/1976 | Kull | 137/608 |
| 4,180,236 A * | 12/1979 | Saarem et al. | 251/30.02 |
| 4,226,259 A * | 10/1980 | Szekely et al. | 251/30.02 X |
| 4,477,051 A * | 10/1984 | Ben-Yehuda | 251/30.01 |
| 4,508,136 A * | 4/1985 | Kah, Jr. | 251/46 X |
| 4,671,485 A * | 6/1987 | Saarem | 251/46 X |
| 4,729,544 A | 3/1988 | Baumann | 251/129.05 |
| 4,986,308 A | 1/1991 | Champseaux | 137/625.44 |
| 5,062,442 A * | 11/1991 | Strenstrom et al. | 137/110 |
| 5,111,996 A * | 5/1992 | Eckstein | 251/127 X |
| 5,161,420 A | 11/1992 | Feng | 74/53 |
| 5,975,486 A * | 11/1999 | Dettmann | 251/30.02 |

FOREIGN PATENT DOCUMENTS

| | | |
|---|---|---|
| AU | B-35258/93 | 9/1993 |
| DE | 1813167 | 6/1970 |
| EP | 0 349 377 | 1/1990 |
| FR | 511.989 | 1/1921 |
| FR | 999.792 | 2/1952 |
| IL | 70200 | 11/1983 |
| IL | 90689 | 6/1989 |

* cited by examiner

Primary Examiner—Kenneth Bomberg
Assistant Examiner—Eric Keasel
(74) Attorney, Agent, or Firm—Leonard Bloom; Robert M. Gamson

(57) ABSTRACT

A hydraulic diaphragm valve comprising a housing, an inlet, an outlet, a diaphragm valve seating between the inlet and the outlet, a sealing diaphragm mounted in the housing and displaceable about the diaphragm valve seating, so as to close and open a flow path between the inlet and outlet, a valve control chamber and a command valve comprising a first duct communicating a one end thereof with the valve inlet, and at an opposite end thereof with a first command valve seating, a second duct communicating into one end with the valve outlet, and at an opposite end thereof, with a second command valve seating. A third duct communicates at one end with the valve control chamber and at its opposite end it selectively communicates with the first and second command valve seatings. A flexible command diaphragm is selectively biased into sealing engagement with one or other of the command valve seatings to effect communication between the third duct and the command valve seating not in seating engagement with the command diaphragm.

4 Claims, 27 Drawing Sheets

CONTROLLED VALVE

CROSS REFERENCE TO RELATED APPLICATION

This application is a continuation-in-part of U.S. application Ser. No. 08/567,073, filed Dec. 4, 1995, now abandoned for which the most recent Continued Prosecution Application was filed Aug. 12, 1999, which in turn is a continuation-in-part of U.S. application Ser. No. 215,282, filed on Mar. 21, 1994, now abandoned.

FIELD AND BACKGROUND OF THE INVENTION

This present invention is generally in the field of an electrically controlled hydraulic diaphragm valve and it is connected also with a flow command valve therefor. The invention is also concerned with other compounds of the diaphragm valve and its control.

Electrical valves of the aforementioned type are used in a variety of applications in which it is desired to control flow through a hydraulic supply line.

In diaphragm valves, the diaphragm itself is disposed between a fluid inlet of the valve's housing and the valve's outlet. There is provided a closure member having a surface area greater than that of the inlet passage. The valve is closed by forcing the closure member against the diaphragm so as to distort the diaphragm onto the fluid inlet, thereby sealing the valve. If the closure member is operated via an electric motor, then one way to apply sufficient force to the closure member would be to employ a correspondingly powerful motor. However, it is usually a requirement to minimize the motor, as much as possible, in order to overcome the valve size, as well as its cost. Miniature electric motors are usually incompatible with the requirement to provide high closure force. Therefore, a transmission mechanism must be employed in order to increase the effective motor force.

Apart from providing a transmission mechanism, it is also required to provide some control means for selectively controlling liquid flow through channels within the valve's housing, said liquid used as a pressurizing media for displacing the diaphragm valve into sealing engagement over a suitable valve seating, whereby the valve is closed.

It is readily noted that some suitable electric circuitry is required and a variety of such switching circuits are available. However, it is one of the objects of the present invention to provide some improved such switching circuitry.

SUMMARY OF THE INVENTION

By a first aspect of the present invention there is provided a novel diaphragm valve. By a second aspect of the present invention there is provided a flow command module for controlling a diaphragm valve in accordance with the present invention.

In accordance with the first aspect of the present invention, there is provided a hydraulic diaphragm valve comprising a main valve housing; a valve inlet and a valve outlet; a diaphragm valve seating formed in said housing and located in a flow-path between said inlet and said outlet; a sealing diaphragm mounted in said housing and displaceable towards and away from said diaphragm valve seating so as to close and open said flow path; a valve control chamber defined between said sealing diaphragm and said housing, and outside said flow-path;

a command valve associated with said valve housing and comprising a first duct communicating at one end thereof with said valve inlet and, at an opposite end thereof, with a first command valve seating; a second duct communicating at one end thereof with said valve outlet and, at an opposite end thereof, with a second command valve seating; a third duct communicating at one end thereof with said valve control chamber and, at its opposite end, selectively with said first and second command valve seatings; a flexible command diaphragm juxtaposed with respect to said first and second command valve seatings; and selectively actuatable biasing means for selectively biasing said command diaphragm into seating engagement with one or other of said command valve seatings so as selectively to effect communication between said third duct and that command valve seating not in sealing engagement with said command diaphragm.

Preferably, said command valve furthermore comprises a command well structure said first and second command valve seatings being located therein, said command diaphragm being positioned in a mouth portion of said well structure so as to overlie said command value seatings.

Still preferably, said valve housing comprises first and second valve housing components with said sealing and command diaphragm held in position between them, said sealing diaphragm defining with said first valve housing component valve inlet and outer chamber respectively communicating with said valve inlet and outlet and, with said second valve component, said valve control chamber.

In accordance with a preferred embodiment, said valve inlet and outlet chambers are of substantially coaxial structure with said outlet-chamber being surrounded by said inlet chamber which is of substantially annular cross-sectional shape, said chambers being separated by a substantially cylindrical wall having an edge portion constituting said diaphragm valve seating.

In accordance with one specific design of the valve, said well structure is formed in said valve housing and wherein said command diaphragm is formed with an outlet aperture communicating with an interior of said well structure, and via said third duct with said valve control chamber.

By a specific embodiment, there is furthermore provided a valve override cock comprising a displaceable shutter located in said outlet-chamber displaceable into and out of interrupting communication between said outlet chamber and said valve outlet and manually actuatable means coupled to said shutter for displacement thereof.

In accordance with a different application, said command well structure is formed in a separate command valve housing there being provided means for mechanically and hydraulically coupling the command valve housing to said valve housing and wherein said third duct communicates on the one hand with an aperture formed in said well structure and, on the other hand, via a coupling port formed in said command valve module, with said valve control chamber. Where the command valve is in separate form, it can be applied onto a large variety of diaphragm valves and may be used as an add-on accessory.

In accordance with one embodiment of the present invention, said valve housing is formed with first and second coupling ports respectively coupled to said valve inlet and outlet and wherein said command valve housing is formed with first and second coupling ports respectively coupled on the one hand to said first and second command valve seatings and on the other hand to said valve housing first and second coupling ports and wherein said main valve housing comprises first and second valve housing components with said sealing and command diaphragm held in position between them, said sealing diaphragm defining with said first valve housing component valve inlet and outer chamber respectively communicating with said valve inlet and outlet and, with said second valve component, said valve control chamber, there being furthermore formed in such second valve housing component a communicating duct which communicates at one end with said valve control chamber and, at an opposite end with a coupling boss which is coupled with a third command housing port.

By a modification of this embodiment, said command housing is formed with first and second enclosures respectively coupled to said first and second command housing coupling ports and to said first and second command valve seatings.

In accordance with a further modification, said command valve seatings are respectively formed by outer rims of first and second nozzles disposed in said well structure and coupled to said first and second command valve coupling parts and wherein said command diaphragm is sealingly supported in said well structure so as to overlie said outer rims.

In accordance with still another embodiment, there is furthermore provided pressure control means for ensuring a substantially constant pressure outflow from said valve.

In accordance with one particular design, said pressure control means comprise flow rate reducing means associated with said second enclosure, an auxiliary flow pathway formed in said command valve housing coupled at one end to said second command housing coupling port and at an opposite end to said command housing third coupling port and including a flow path of said flow rate reducing means, and a constant flow pressure control means associated with said first enclosure and having an inlet coupled to said third command coupling port and an outlet coupled to said first command coupling port.

By one modification, said flow rate reducing means and said constant flow pressure control means are respectively incorporated in sealing plugs adapted to be removably fitted to said enclosures.

By another modification, said enclosures are respectively formed with central tubular portions which are respectively spaced apart from walls of said enclosures and which project outwardly from a central partition wall serving to separate said enclosures, there being formed within said command valve housing a communication duct between said second tubular portion and said third coupling port and constituting part of said auxiliary pathway.

In accordance with one specific embodiment, said sealing plugs are respectively formed with central projections, the projection of the pressure control means sealing plug being adapted to fit sealingly into said first tubular portion with the plug outlet being located within the first tubular portion, the projection of the flow rate reducing sealing plug being formed with a labyrinthine groove so as to define with said second tubular portion in which it is adapted to fit sealingly a labyrinthine groove having an inlet located within said second enclosure in communication with said second command communication port and being an outlet located within said second tubular portion.

By another specific embodiment, one of said sealing plugs is formed with a projection adapted to fit sealingly within said second tubular portion so as to seal off said auxiliary pathway.

In accordance with a second aspect of the present invention, there is provided a command valve module for use in controlling opening and closing of a flow valve and comprising a command valve housing, first and second enclosures of said housing separated by a central portion wall of the housing; first and second central tubular portions located respectively in such enclosures and respectively spaced from walls of said enclosures; a command valve well structure formed in said housing; first and second spaced apart nozzles formed in said well structure and respectively communicating, via ducts formed in said housing with first and second coupling ports of said housing; an aperture formed in said well structure and coupled via a duct formed in said housing with a third coupling port; outlet rims of said first and second nozzles constituting first and second command valve seatings; and a command valve diaphragm sealingly supported in said well structure so as to overlie said command valve seatings.

Preferably said first and second enclosures are respectively provided with removable first and second sealing plugs.

In accordance with an embodiment of this aspect of the invention, said first and second sealing plugs respectively serve as pressure controlling and flow rate reducing means and are respectively adapted to seal the first and second enclosures; said first and second plugs being respectively formed with first and second central projections, said first projection being adapted to fit sealingly into said first tubular portion an outlet of said first plug being located within said first tubular portion and an inlet of said first plug being located within said first enclosure, said second projection being formed with a labyrinthine groove so as to define with said second tubular portion in which it is adapted to be sealingly fitted, a labyrinthine groove having an inlet located within said second enclosure in communication with said second communication port and having an outlet located within said second tubular portion, there being formed within said command valve housing a communication duct between said second tubular portion and said third coupling port and forming part of an auxiliary pathway.

In accordance with a different embodiment, there are additionally provided a pair of alternative sealing plugs for use solely in sealing said enclosures and wherein one of said sealing plugs is formed with a projection adapted to fit sealingly within said second tubular portion so as to seal off said auxiliary pathway.

BRIEF DESCRIPTION OF THE DRAWINGS

In order to understand the invention and to see how it may be carried out in practice, some preferred embodiments will now be described, by way of non-limiting examples only, with reference to the accompanying drawings, in which.

DETAILED DESCRIPTION OR PREFERRED EMBODIMENTS

Figure 1:
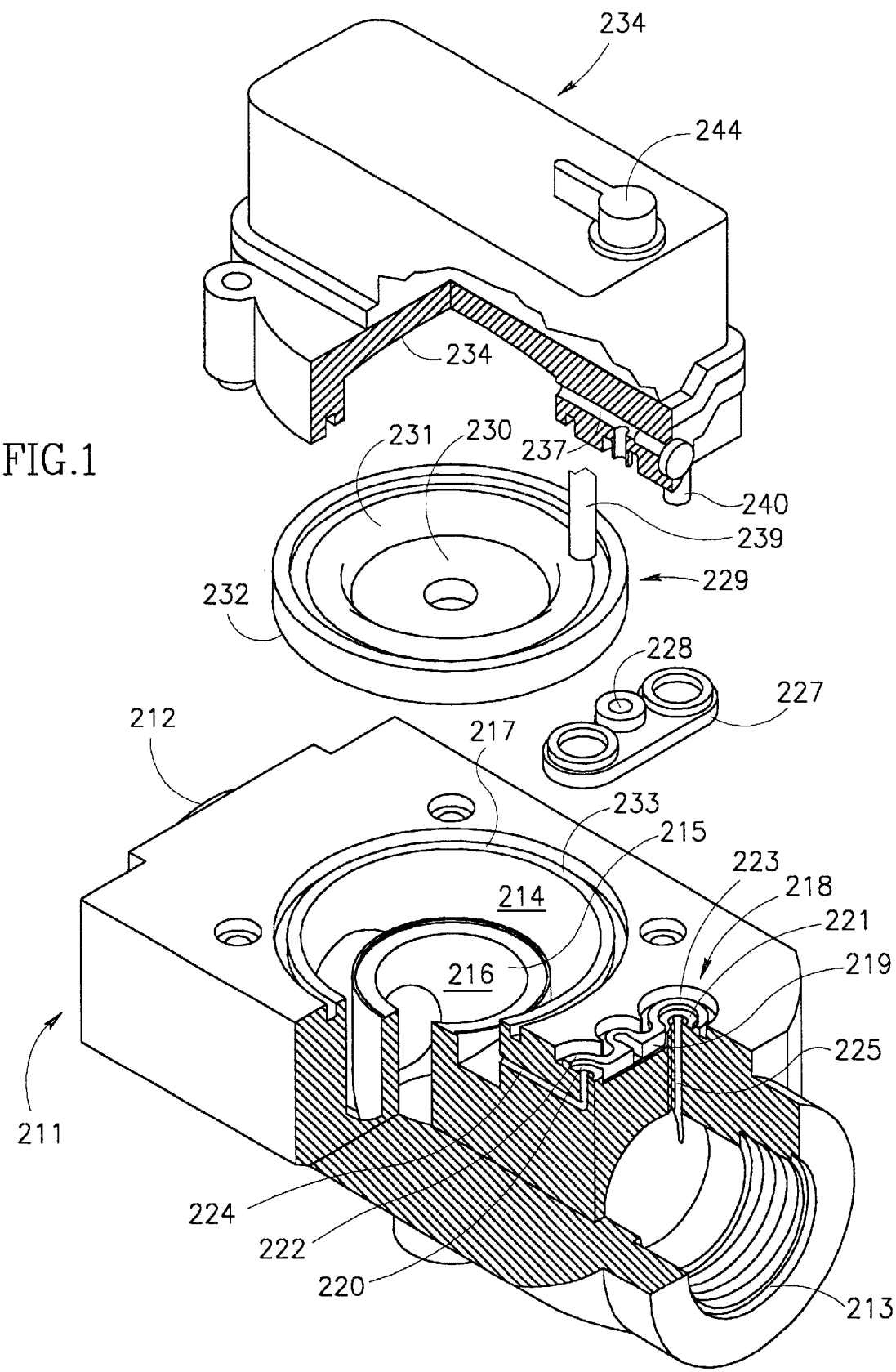
FIG. 1 is an exploded perspective view of a first embodiment of an electrically operated hydraulic valve according to the invention.

Reference will now be made to FIGS. 1 to 5 of the drawings for a detailed description of a first embodiment of an electrically operated hydraulic valve in accordance with the present invention.

The valve comprises an elongated valve housing block 211 constituting a first housing component which is formed at one end thereof with a liquid inlet port 212 and at the opposite end thereof, with a liquid outlet port 213.

Formed in a central position of the housing block 211 is a substantially cylindrical inlet chamber 214 of essentially annular cross-sectional shape which communicates with the liquid inlet port 212.

Formed within the inlet chamber 214 and separated therefrom by a cylindrical wall 215 is a centrally disposed outlet chamber 216, substantially coaxial with the inlet chamber 214 and which communicates with the liquid outlet port 213. An upper edge of the cylindrical wall 215 constitutes diaphragm valve seating 217.

The hydraulic valve is furthermore provided with a command valve which comprises a command well structure 218 which is formed in a recessed wall portion of an upper surface of the valve housing block 211 adjacent to the liquid outlet port 213.

Located within the command well structure 218 is an elongated valve seating insert 219 formed with first and second circular apertures 220 and 221 whose respective rims constitute first and second command valve seatings 222 and 223.

A first communicating duct 224 is formed in the valve housing block 211 and communicates at one end thereof with the inlet chamber 214 and at the other end thereof with the first command valve seating 222.

A second communicating duct 225 communicates at one end thereof with the outlet port 213 and, at the other end thereof, with the second command valve sealing 223.

The insert is furthermore formed centrally between the command valve seatings 222 and 223 with a recess 226.

An elongated command diaphragm 227 fits into the mouth of the command well structure 218 so as to be juxtaposed with respect to the valve seating insert 219. The command diaphragm 227 is formed with a central, thoroughgoing outlet aperture 228 which overlies and communicates with the recess 226.

The command diaphragm 227 is so formed, shaped and dimensioned that when it is respectively biased against either of the first and second command valve sealings 222 and 223 it respectively seals one or other of the apertures 220 and 221 and therefore, the outlets of the first and second ducts 224 and 225. On the other hand, when the command diaphragm is not biased against one of the command valve seatings 222 and 223, communication is established between the duct opening into the aperture of that seating via the recess 226 and the central outlet aperture 228 of the command diaphragm 227.

A central, main sealing diaphragm 229 comprises a central rigid sealing disc 230 formed integrally with an annular flexible diaphragm 231 having a peripheral rim 232 which fits into and is supported in a peripheral slot 233 surrounding the mouth of the inlet chamber 214. The sealing disc 230 is displaceable to and away from the diaphragm valve seating 217 consistuted by the upper edge of the cylindrical wall 215.

The valve is furthermore provided with an upper cover member 234 constituting a second housing component which fits on and is secured to the valve housing block 211 and serves, inter alia, to clamp in position the main sealing diaphragm 229 and the command diaphragm 227. A central portion 235 of the cover member 22 defines with the upper surface of the sealing diaphragm 227 a control chamber 236.

A third communication duct 237 is formed in the cover member 234 and communicates at one end with the control chamber 236 and, at an opposite end, with the control outlet aperture 228 of the command diaphragm 227.

Also located within the cover member 234 is an electrically operated, selective biasing means 238 (to be described in detail below) for the command diaphragm 234, and which includes a pair of toggle operated first and second abutment members 239 and 240 whose lowermost free ends are adapted to bear alternatively and respectively on the command diaphragm 227 opposite the first and second command valve seatings 222 and 223.

Figure 2:
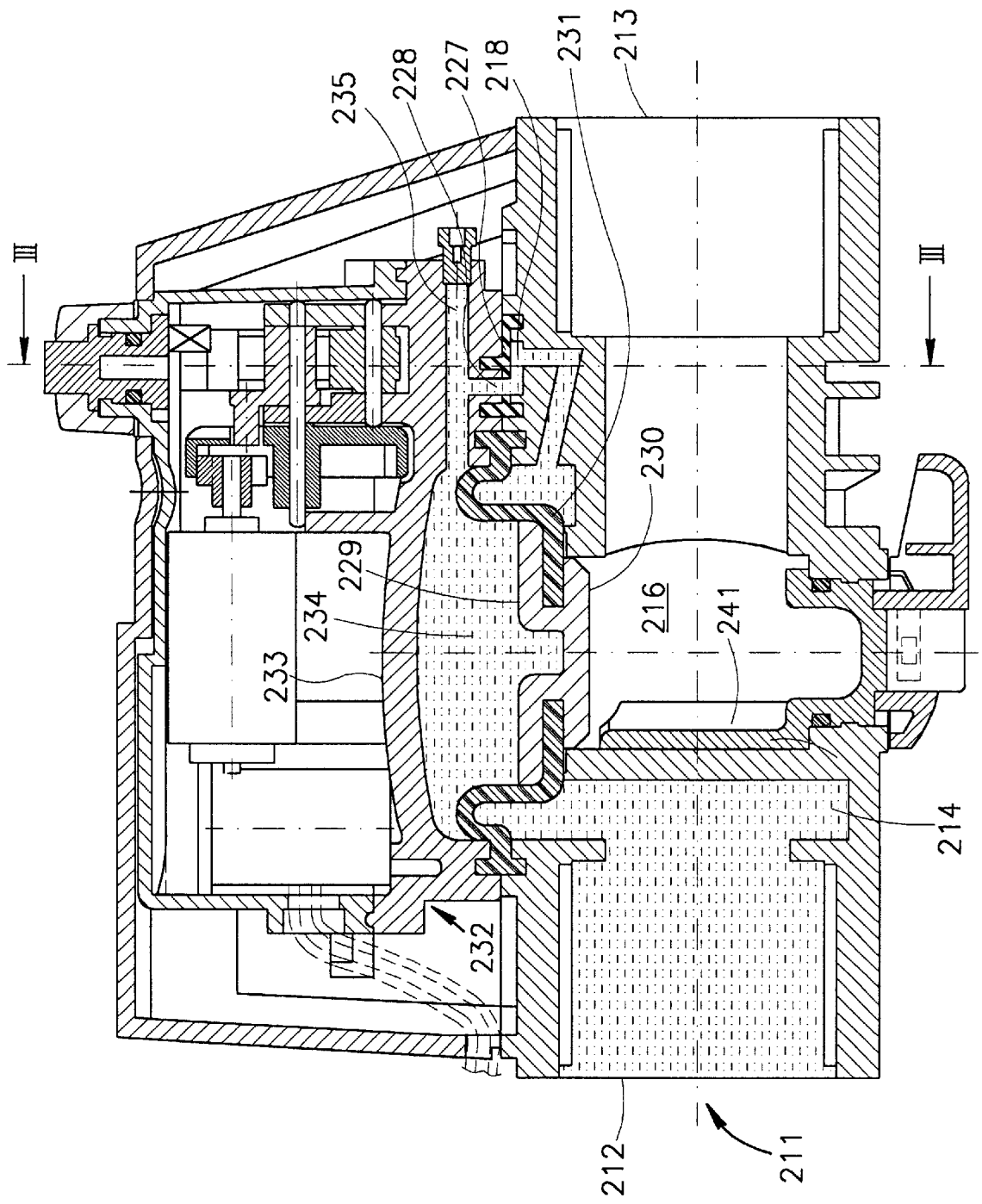
FIG. 2 is a longitudinally sectioned view of the assembled valve.
Figure 3:
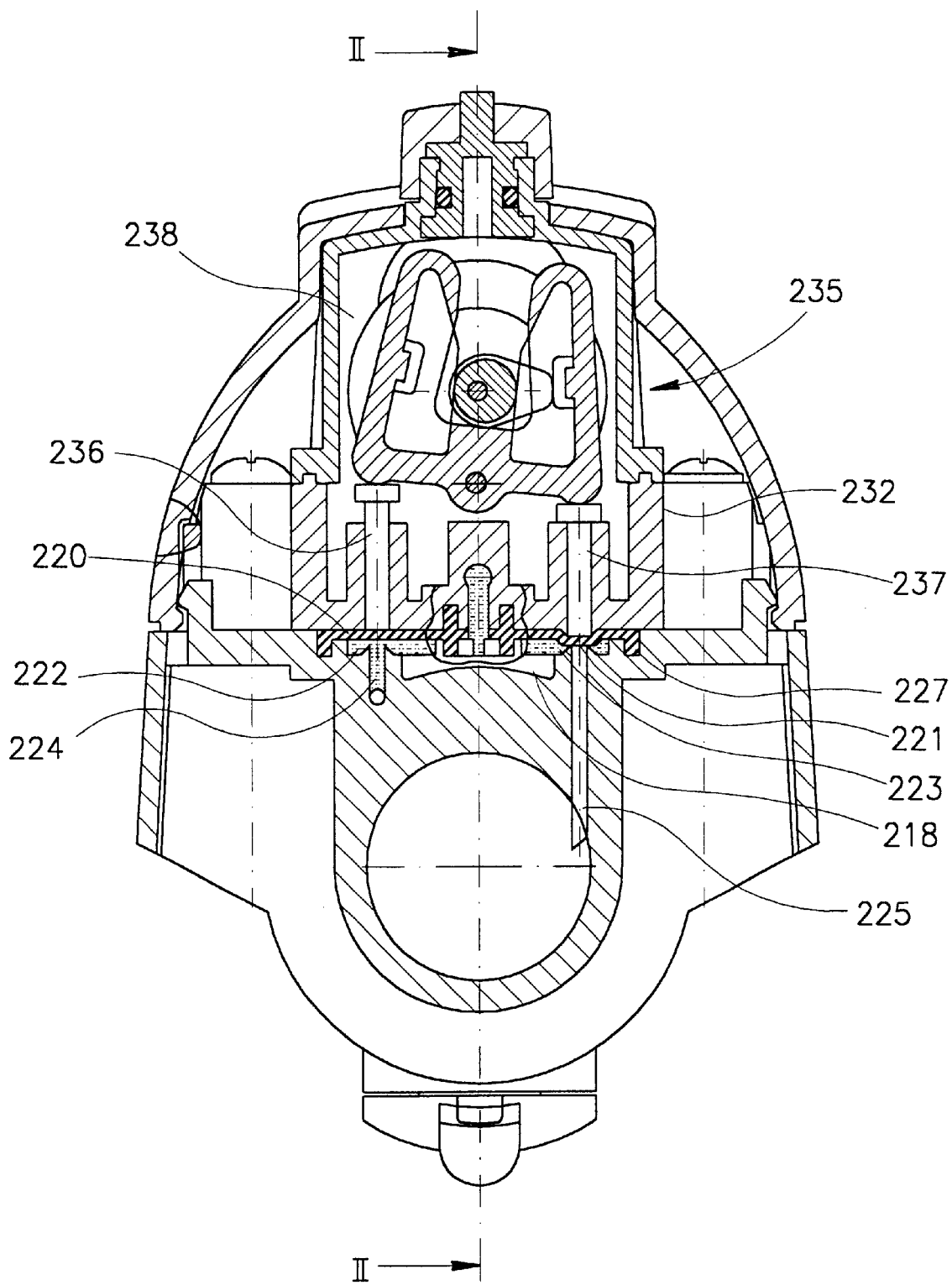
FIG. 3 is a cross sectional view of the valve as shown in FIG. 2 taken along the line III—III.
Figure 4:
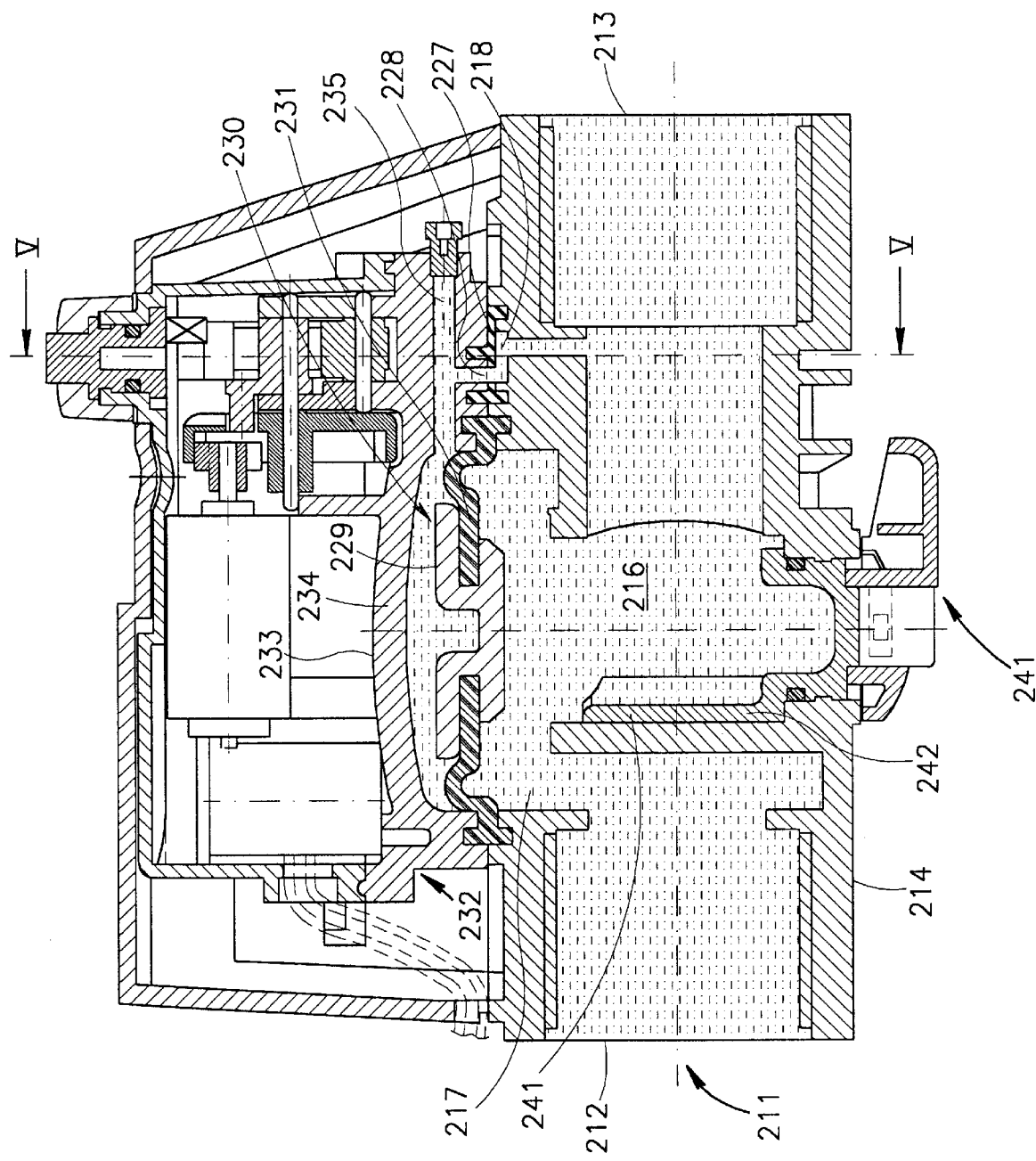
FIG. 4 is a longitudinally sectioned view of the valve when open.

At seen in FIGS. 2 and 4 of the drawings, the valve is furthermore provided with an override cock 241 comprising a displaceable shutter 242 localized in the outlet chamber 216 and coupled to a rotary handle 243 so as to be rotatably displaceable into and out of interrupting communication between said outlet chamber 216 and said valve outlet 213.

Additionally, and as seen in the drawings, the valve is provided with a mechanical override 244 which allows for the manual displacement of the selective biasing means 238 for opening and closing of the valve as required.

Figure 5:
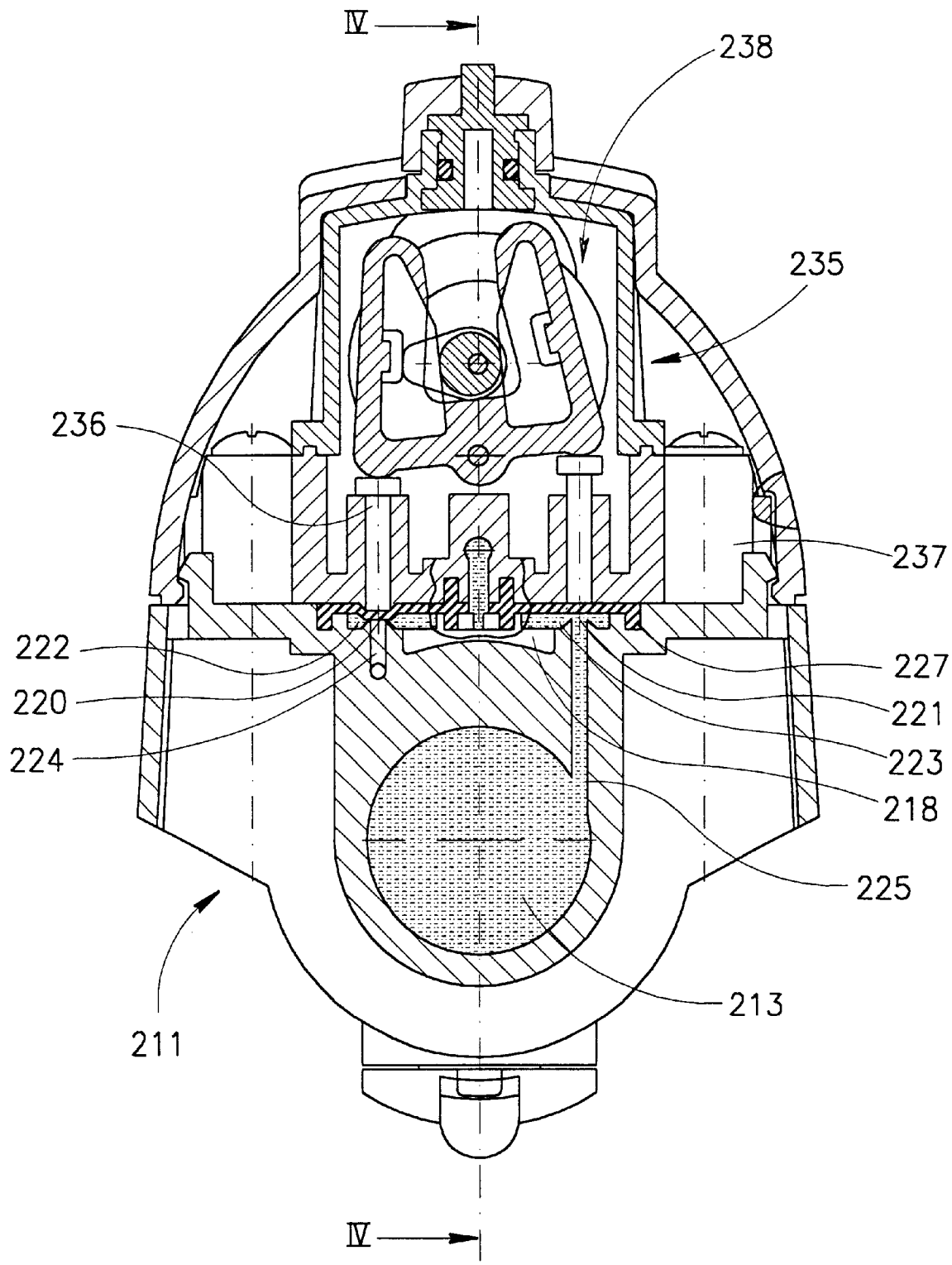
FIG. 5 is a cross-sectional view of the valve as shown in FIG. 4 taken along the line V—V.

The basic operation of the valve takes place as follows:

In the open valve condition, i.e. when water flows through the valve from the inlet port 212 to and out of the outlet port 213 then, as shown in FIG. 5 of the drawings, the first abutment member 239 is biased against the command diaphragm 227 so as to press it sealingly against the first command valve seating 222 thereby sealing off the first communicating duct 224 from the inlet chamber 214. On the other hand, by virtue of the toggle operation the second abutment member 240 does not sealingly bias the command diaphragm 227 against the second command valve seating 223. Water pressure arising out of the inflow of water from the inlet port 212 into the inlet chamber 214 acts on the under surface of the main sealing diaphragm 229 forcing it upwardly, (ti being free to move seeing that the control chamber 236 is vented via the third communicating duct 237, the command diaphragm outlet aperture 228, the recess 226 and the second communicating duct 225). In this way water can flow from the inlet chamber 214 to the outlet chamber 206 and from there out of the outlet port 216.

When however the toggle arrangement operates so that the second abutment member 240 presses the command diaphragm 229 against the second command valve seating 223 thereby sealing off the second communicating duct 225, there is at the same time, opened up the first communicating duct 224 and water flows out of this duct 224 via the recess 226 into the third communicating duct 237 and therefrom into the control chamber 236. The hydraulic pressure developed as a result, in this otherwise sealed-off control chamber 236, serves to bias the sealing disc 230 of the main sealing diaphragm 229 against the diaphragm valve seating 217 thereby closing off communication between the inlet chamber 214 and the outlet chamber 216 and, in consequence, effectively closing the valve.

Referring now to FIGS. 6 to 16 of the drawings, there will now be described a further embodiment of an electrically operated hydraulic valve in accordance with the present invention. The valve comprises a central, substantially cylindrical valve housing 311 with a pair of integrally formed, radially directed, inlet and outlet arms 312 and 313. The inlet arm 312 defines a first valve inlet 314a whilst the outlet arm 313 defines a valve outlet 315. There is formed at the lower end of the central cylindrical housing 311 a second valve inlet 314b which is normally directed with respect to the first valve inlet 314a.

A cylindrical wall 316 is centrally located within the cylindrical valve housing 311 so as to define a central, cylindrical, inlet chamber 317 surrounded by a cylindrical outlet chamber 318 of substantially annular cross-sectional shape.

The valve inlet 314a communicates with the interior of the inlet chamber 317 via an inlet aperture 319 formed in the cylindrical wall 316 whilst the valve outlet 314a communicates with the outlet chamber 318 via an outlet aperture 328 formed in the wall of the housing 311. The valve inlet 314b communicates directly with the inlet chamber 317.

An uppermost edge of the cylindrical wall 316 is insert with respect to the upper end of the cylindrical housing 311 and serves as a main diaphragm valve seating 321 as will be explained below.

Figure 6:
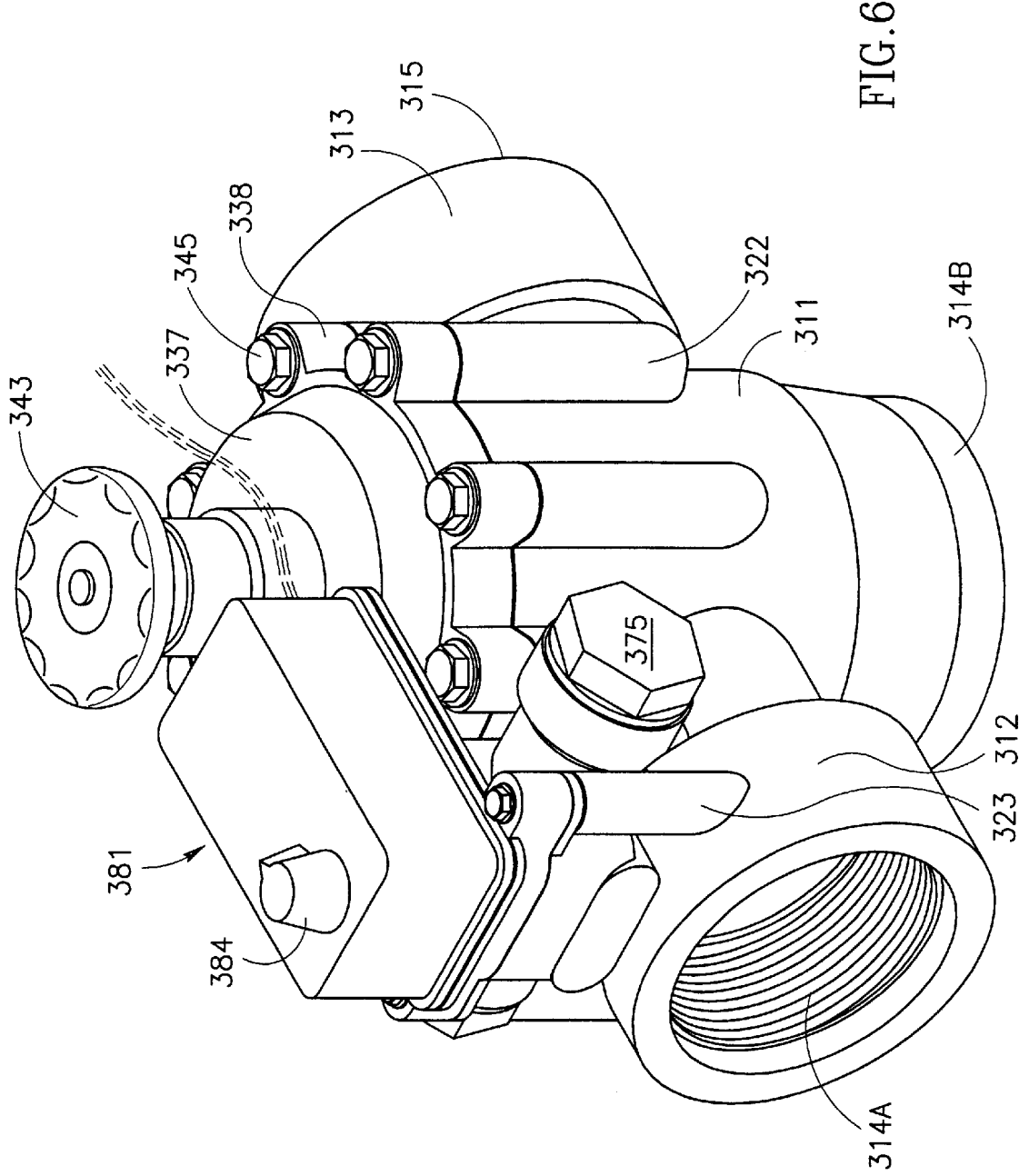
FIG. 6 is a perspective view of a second embodiment of an electrically operated hydraulic valve according to the invention.
Figure 7:
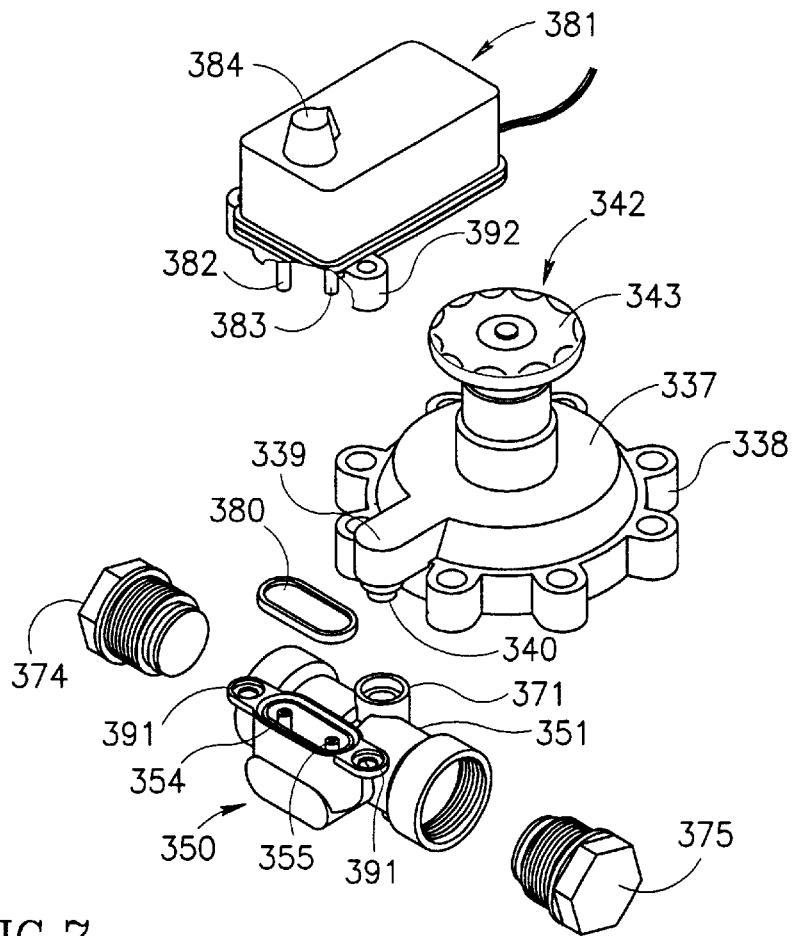
FIG. 7 is an exploded perspective view of the valve shown in FIG. 6.
Figure 7:
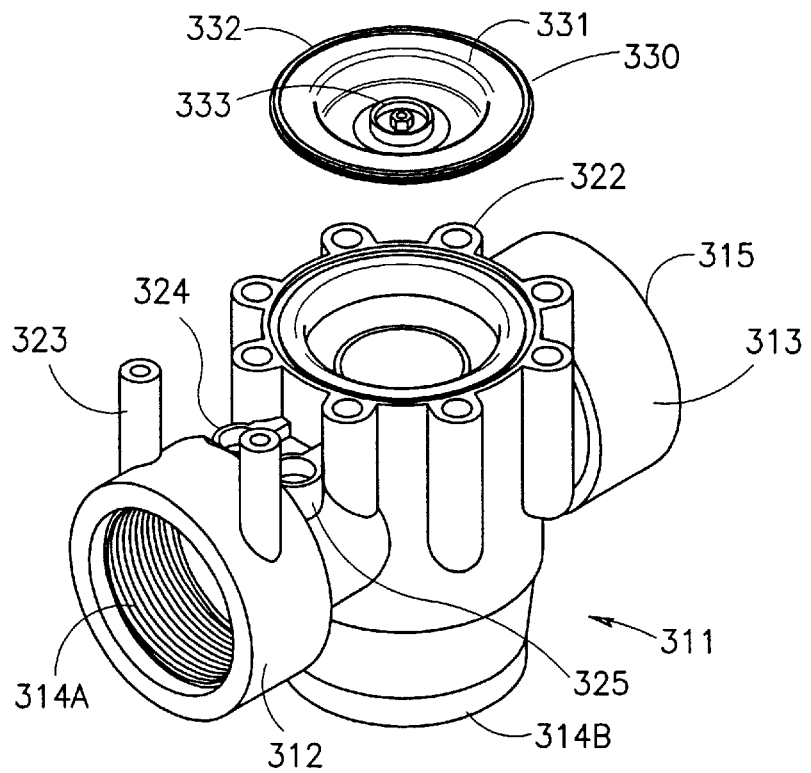
Figure 8:
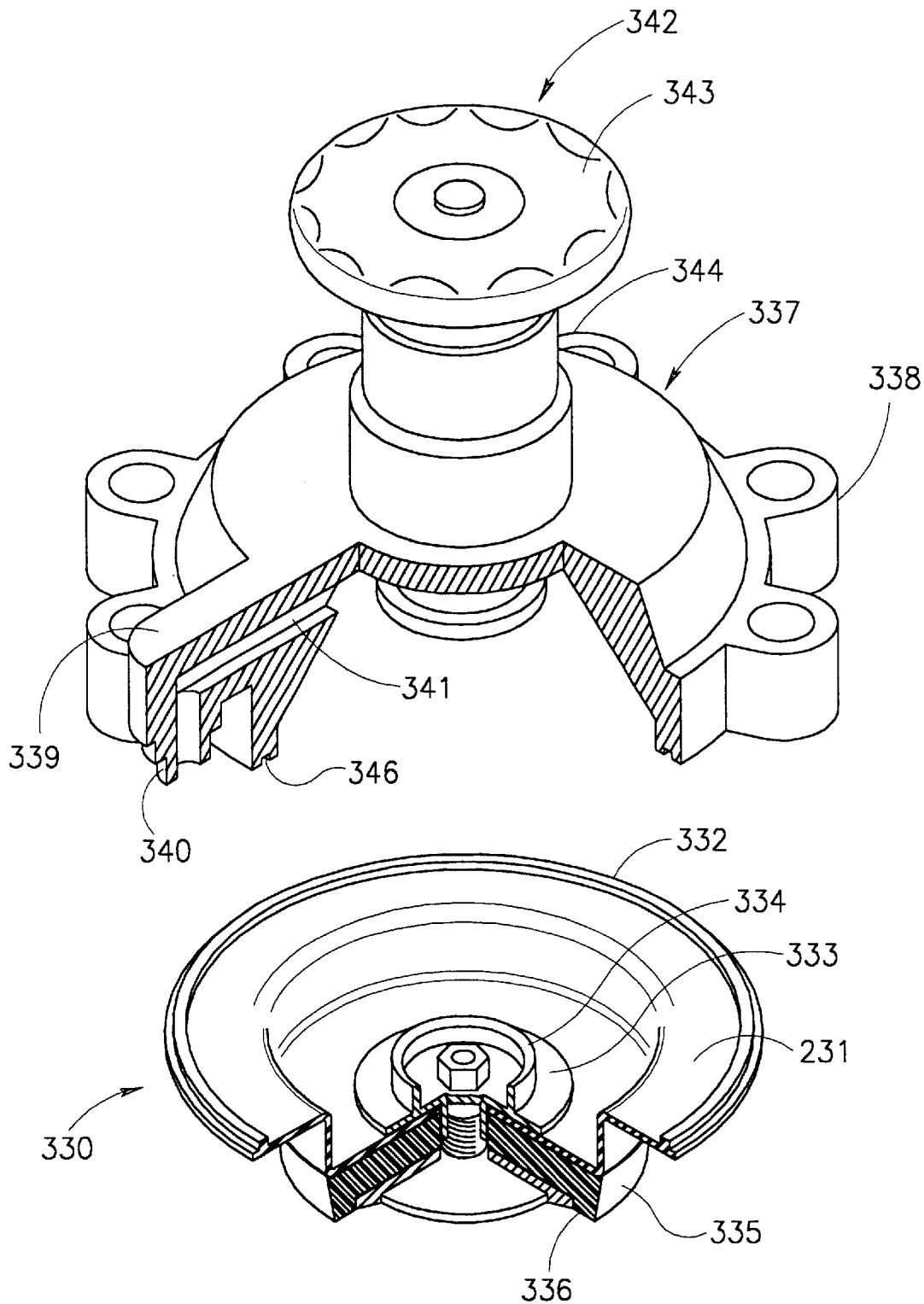
FIG. 8 is an exploded perspective view of a valve cover member and dish-shaped diaphragm.
Figure 9:
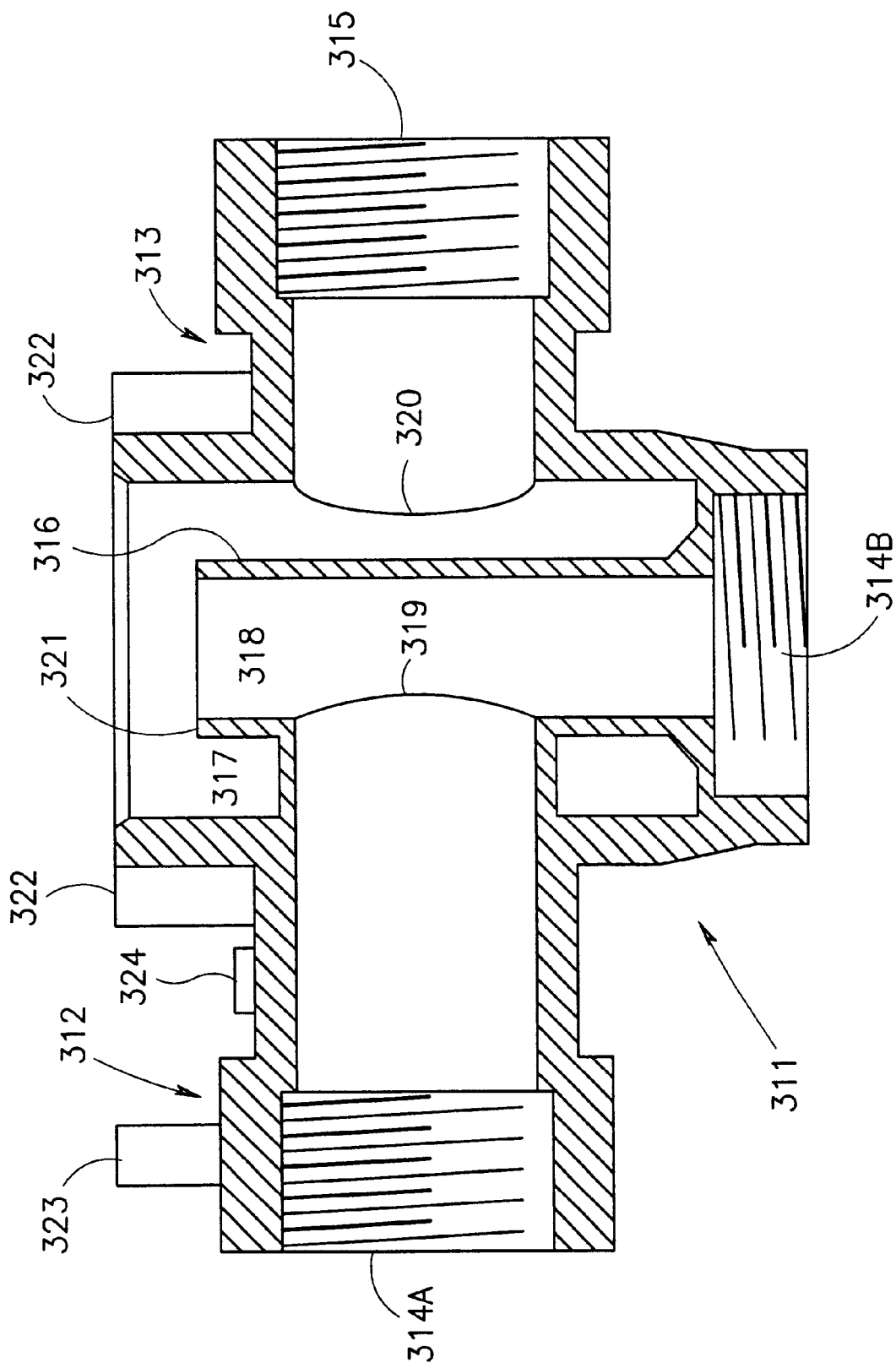
FIG. 9 is a schematic longitudinally sectioned view of the housing of the valve.
Figure 10A:
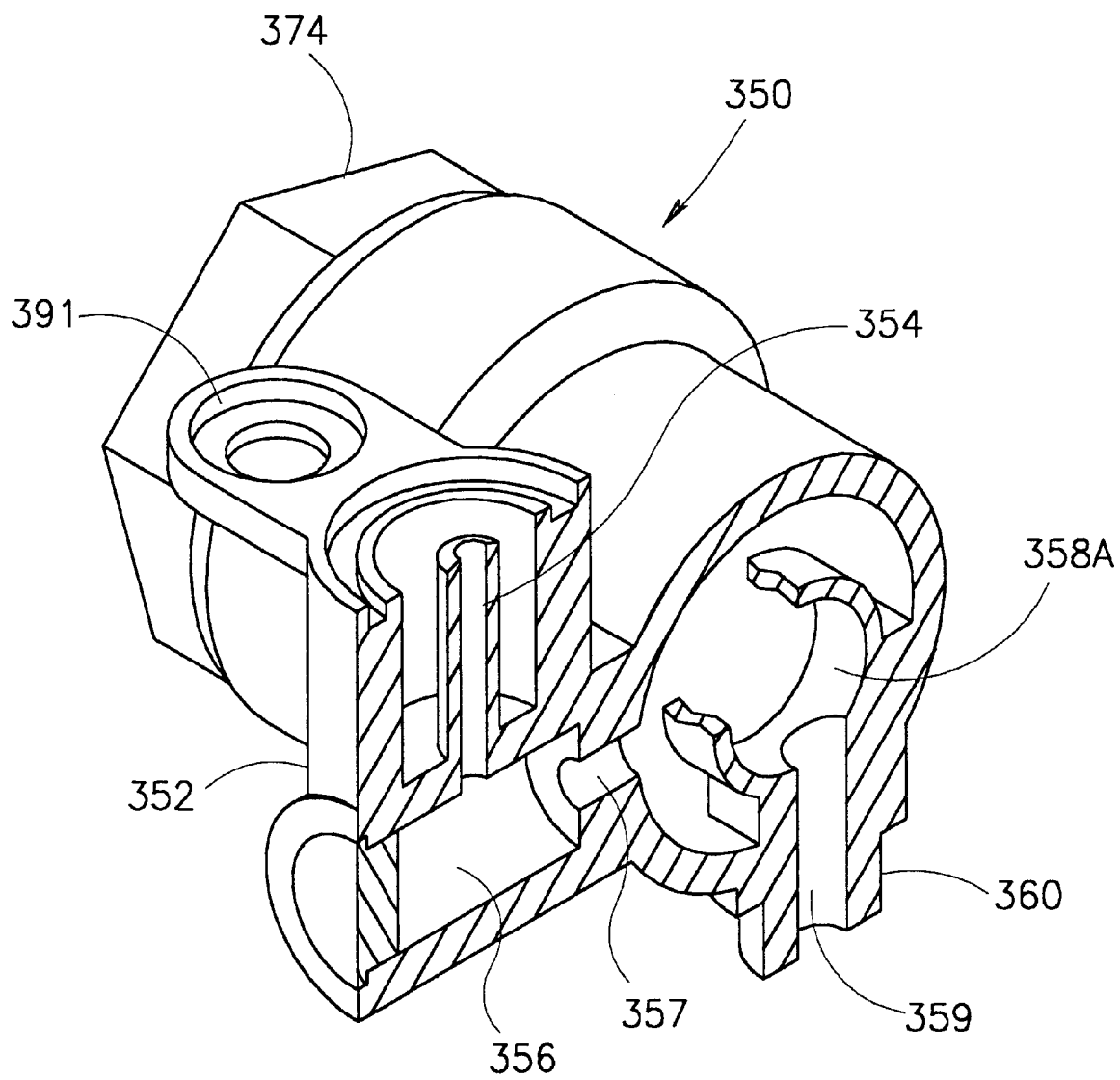
FIG. 10 consists of FIGS. 10a, 10b and 10c which are cross-sectional views of a command module of the valve taken respectively through a first nozzle, a central aperture and a second nozzle thereof.
Figure 10B:
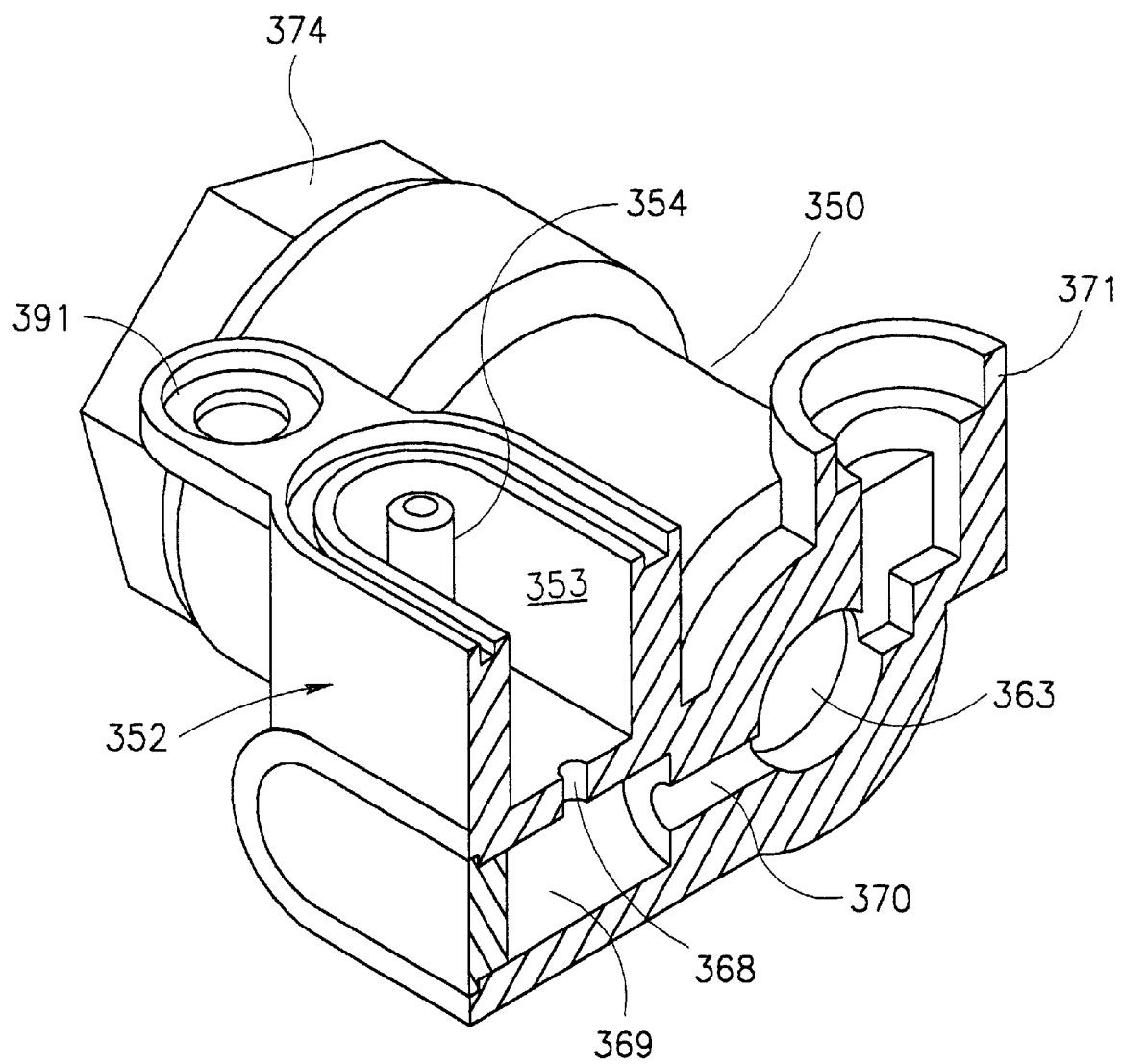
Figure 10C:
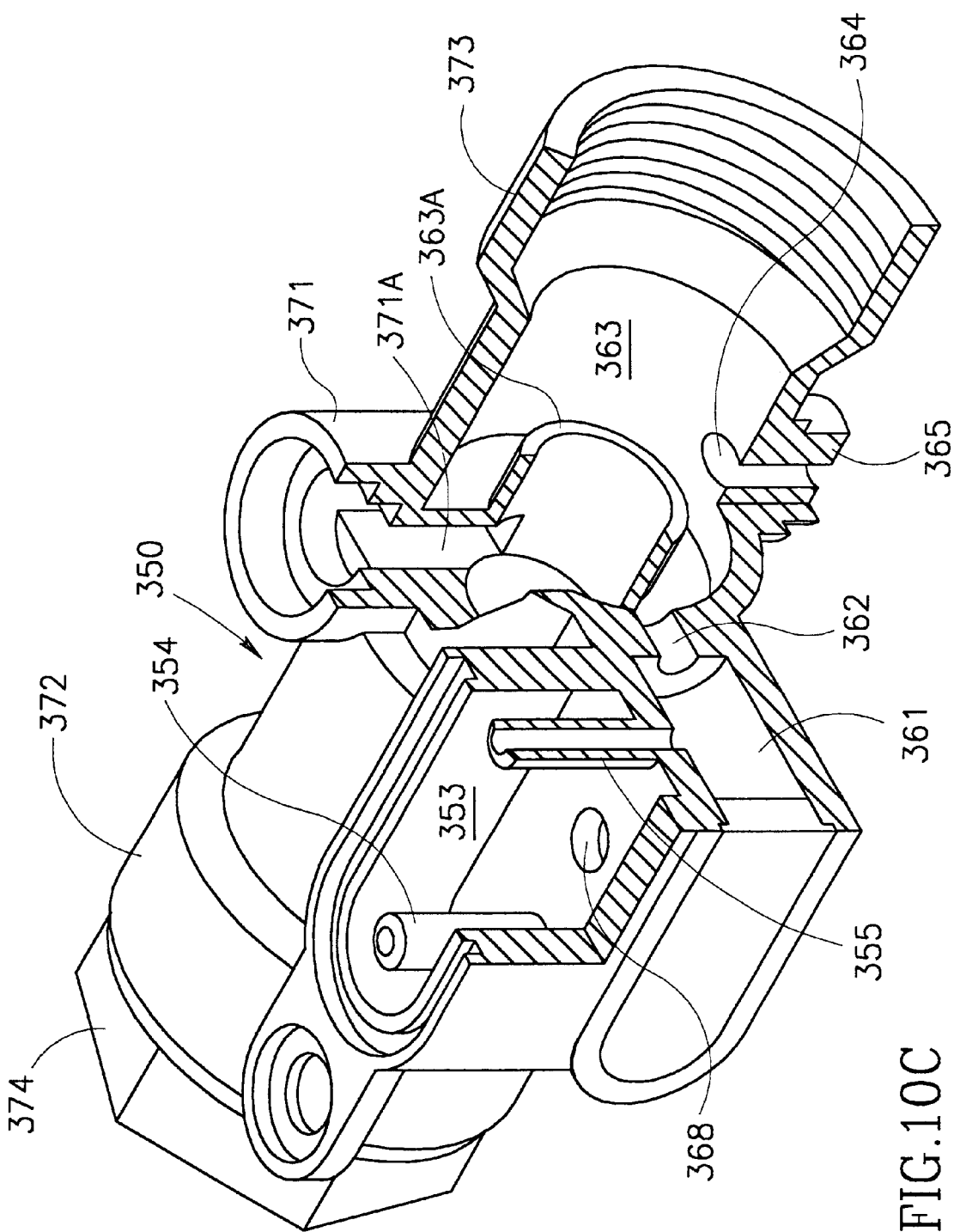
Figure 11:
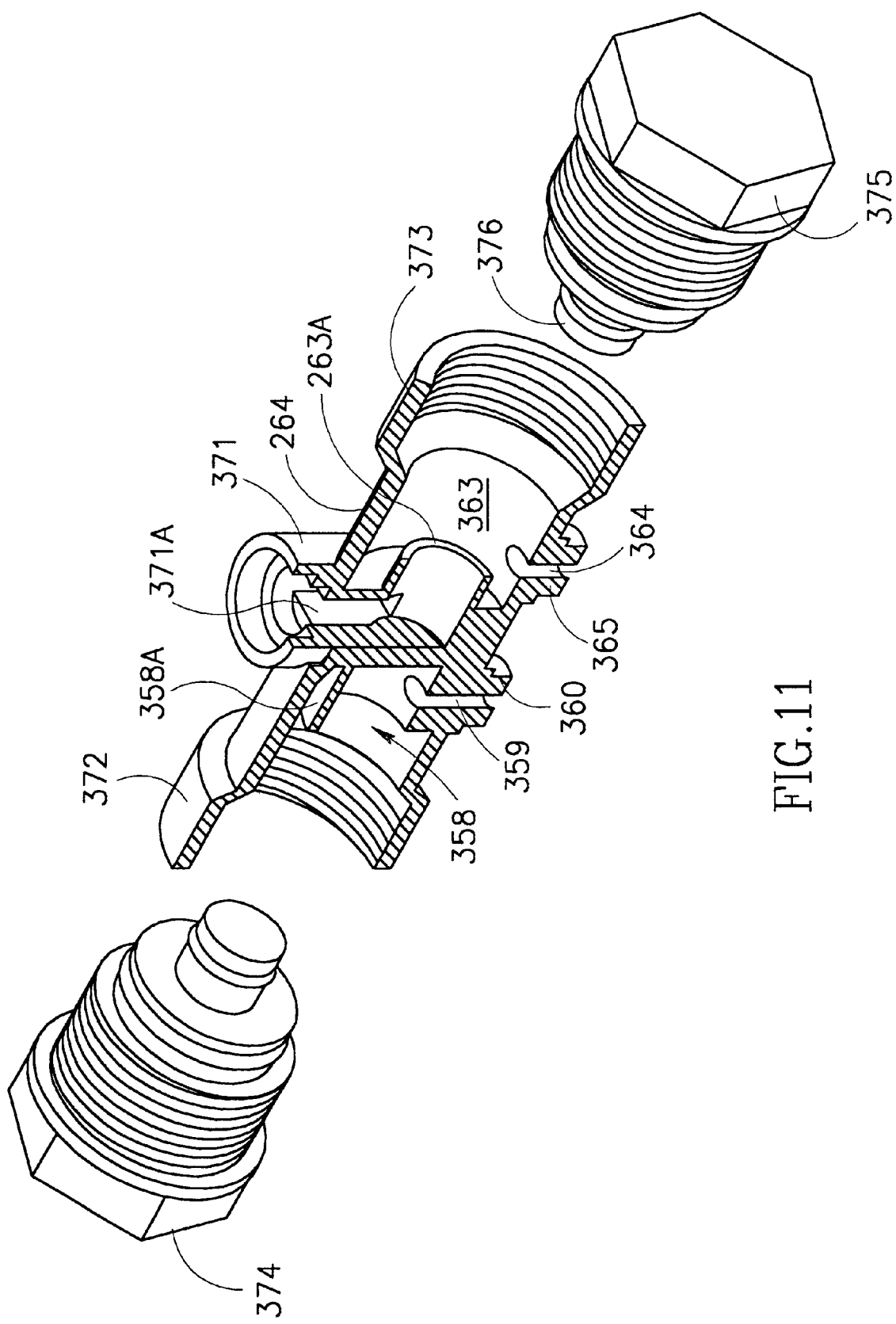
FIG. 11 is a longitudinally sectioned perspective view of the command module with sealing plus thereof shown detached.
Figure 12:
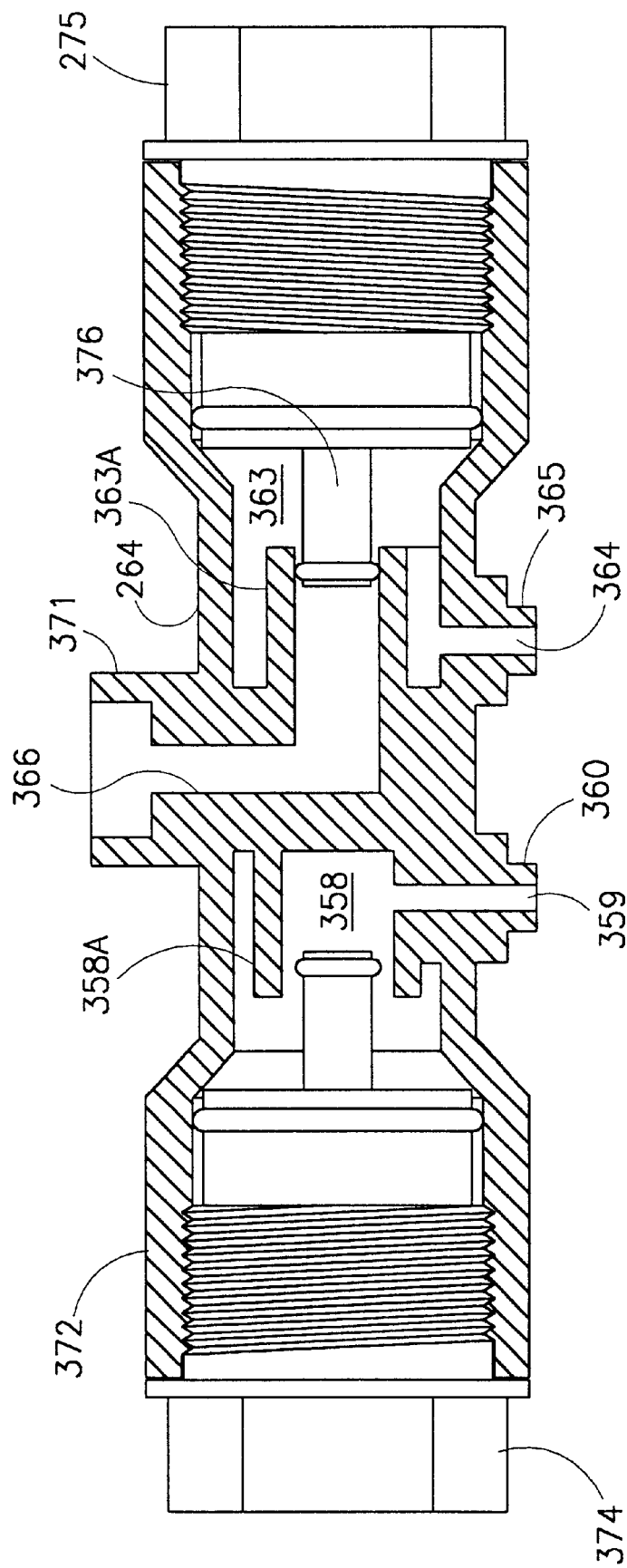
FIG. 12 is a longitudinally sectioned view of the command module shown in FIG. 11 when assembled.

As can be seen in FIGS. 6 and 7 of the drawings an outer wall of the cylindrical valve housing 311 has formed, integrally therewith, a plurality of equiangularly spaced apart screw coupling posts 322. A further pair of coupling ports 323 extend upwardly from the inlet arm 312. As can be seen in FIG. 7 of the drawings there is also formed in the coupling arm 312 first and second coupling ports 324 and 325. The first coupling port 324 communicates via a communicating duct (not shown) with the outlet chamber 318 whilst the second coupling port 325 communicates directly with the valve inlet 314a.

The valve furthermore comprises a dish shaped main sealing diaphragm 330 having an outer, annular flexible portion 331 terminating in a peripheral coupling rim 332 and having a central rigid portion 333 comprising a rigid upper components 334 and a rigid lower component 335 on the under surface of which is located an annular sealing ring 336.

There is furthermore provided a valve housing cover member 337 of inverted dish shape formed with peripheral equiangularly distributed coupling lugs 338. Formed integrally with the housing cover member 337 and extending radially outwardly therefrom is a coupling member 339 which terminates in a coupling boss 340. A communicating duct 341 extends through the coupling member 339 and communicates at one end thereof with the interior of the dish shaped cover member 337 and at the opposite end thereof with an outlet of the coupling boss 340.

The cover member 337 is furthermore provided with an override cock 342 comprising a rotary handle 343 secured to a screw rod 344 which is screw coupled to the cover member 337 so as to be capable of displacement into and out of the dish shaped region defined by the cover member 337.

When assembled, the main sealing diaphragm 230 is sandwiched between the cover member 337 and the cylindrical valve housing 311. The latter are secured together by bolts 345 which extend through the aligned coupling lugs 338 and coupling posts 322 with the peripheral coupling rim 332 of the diaphragm 330 being firmly held between the cover member 337 and the housing 311 and being located in a correspondingly shaped annular slot 346 formed in a downwardly projecting portion of the cover member 337.

In this position, the annular sealing ring 336 is juxtaposed with respect to the diaphragm seating 321 formed in the housing 311.

Furthermore, the flexible diaphragm 330 defines with the cover member 337, an upper valve control chamber 347.

As seen in FIGS. 7 and 10 to 15 of the drawings, the valve is provided with a detachable flow command module 350 which comprises an elongated, substantially cylindrical, module housing 351 formed integrally with a branch housing 352. The branch housing 352 defines a command well structure 353, open at the top and formed integrally, at either end thereof with first and second upwardly extending nozzles 354 and 355, the ends of which constitute first and second command valve seatings. The first nozzle 354 communicates via a first transverse tubular passage way 356 formed in the branch housing 352 and a first communicating duct 357 formed in the wall of the module housing 351 with first enclosure 358 defined within a left-hand portion of the module housing 351 and provided with a communicating duct 359 extending to a first coupling port 360.

The second nozzle 355 communicates via a second transverse passage way 361 formed in the branch housing 351 and a second communicating duct 362 formed in the wall of the module housing 351 with a second enclosure 363 defined within a right-hand portion of the module housing 351. The second enclosure 363 is provided with a communicating duct 364 extending to a second coupling port 365.

The first and second enclosures 358 and 363 are separated by a housing partition wall 366 from which extend respectively into the enclosures 358 and 363 first and second central tubular portions 358a and 363a.

There is furthermore formed in a base of the command well structure 353 a central aperture 368 which communicates via a third transversely directed passageway 369 and a third communicating duct 370 formed in a wall of the module housing 351 with, one the one hand the second enclosure 363 and, on the other hand, via the second tubular portion 363a and a by-pass 371a with a third coupling port 371.

As can be seen from the drawings, the module housing 351 is open at each end, this having been dictated by technical plastics molding considerations. Threaded first and second open-end portions 372 and 373 are normally sealed in use by means of appropriate first and second screw sealing plugs 374 and 375.

An elongated, resiliently flexible command diaphragm 380 fits sealingly within the mouth of the command well structure 353 and rests on command valve seatings 354a to 355a constituted by the upper ends of the nozzles 354 and 355 so that when the diaphragm 380 is biased against one of the command valve seatings, fluid flow through that nozzle is prevented whilst fluid flow can freely take place through the other command valve seating agsinst which the diaphragm 380 is not biased.

An electrically operated selective biasing means 381 (to be described in detail below) for the command diaphragm 380 includes first and second toggle operated, abutment members 382 and 383. When assembled the command module 350 is press fitted between the pairs of posts, 322 and 323 such that the coupling ports 336 and 365 sealingly within the coupling ports 324 and 325.

The module branch housing 352 is formed with a pair of apertured coupling lugs 391 whilst the selective biasing means 381 is also provided with a pair of apertured coupling lugs 392. With the command module 350 in position, its coupling lugs 391 are aligned with the coupling posts 323, the coupling lugs 392 of the biasing means 381 are also aligned therewith and the control module 350 and the biasing means 381 are firmly clamped to the valve housing 311 by means of appropriate bolts 393.

In this aligned clamped position, the lowermost ends of the selective biasing first and second abutment members 382 and 383 are juxtaposed with respect to the command diaphragm 380 directly opposite the outlets of first and second nozzles 354 and 355.

Additionally, and as seen in the drawings, the selective biasing means 381 is operated with a mechanical override 384 which allows for the manual displacement of the abutment members 382 and 383 for opening and closing of the valve as required.

The mode of operation of the valve will now be described with reference to FIGS. 10 to 15 of the drawings.

In order for the valve to be rendered open, i.e. for water to flow from the valve inlets 314a or 314b through and out of the valve outlet 315 communication must be established between the inlet chamber 317 and the outlet chamber 318. To this end the main sealing diaphragm 350 must be displaced upwardly, from the full line position as shown, to its broken line position (as seen in FIGS. 15a, 15b and 15c) thereby lifting the annular sealing ring 336 from off the diaphragm valve seating 321.

Similarly, in order to close the valve, the diaphragm 330 must be displaced from its broken line position and retained downwardly in its full line position, with the annular sealing ring 336 held in sealing contact with the seating 321.

Thus, in order to open the valve, the diaphragm 330 must be free to move upwardly into its broken line position and to this end, the control valve chamber 347, must be capable of being vented. On the other hand, when it is desired to close the valve it has to be ensured that there is a water flow into the control valve chamber 347 which results in pressing the diaphragm 350 downwardly into its full line position and into sealing engagement with diaphragm seating 321.

Figure 15A:
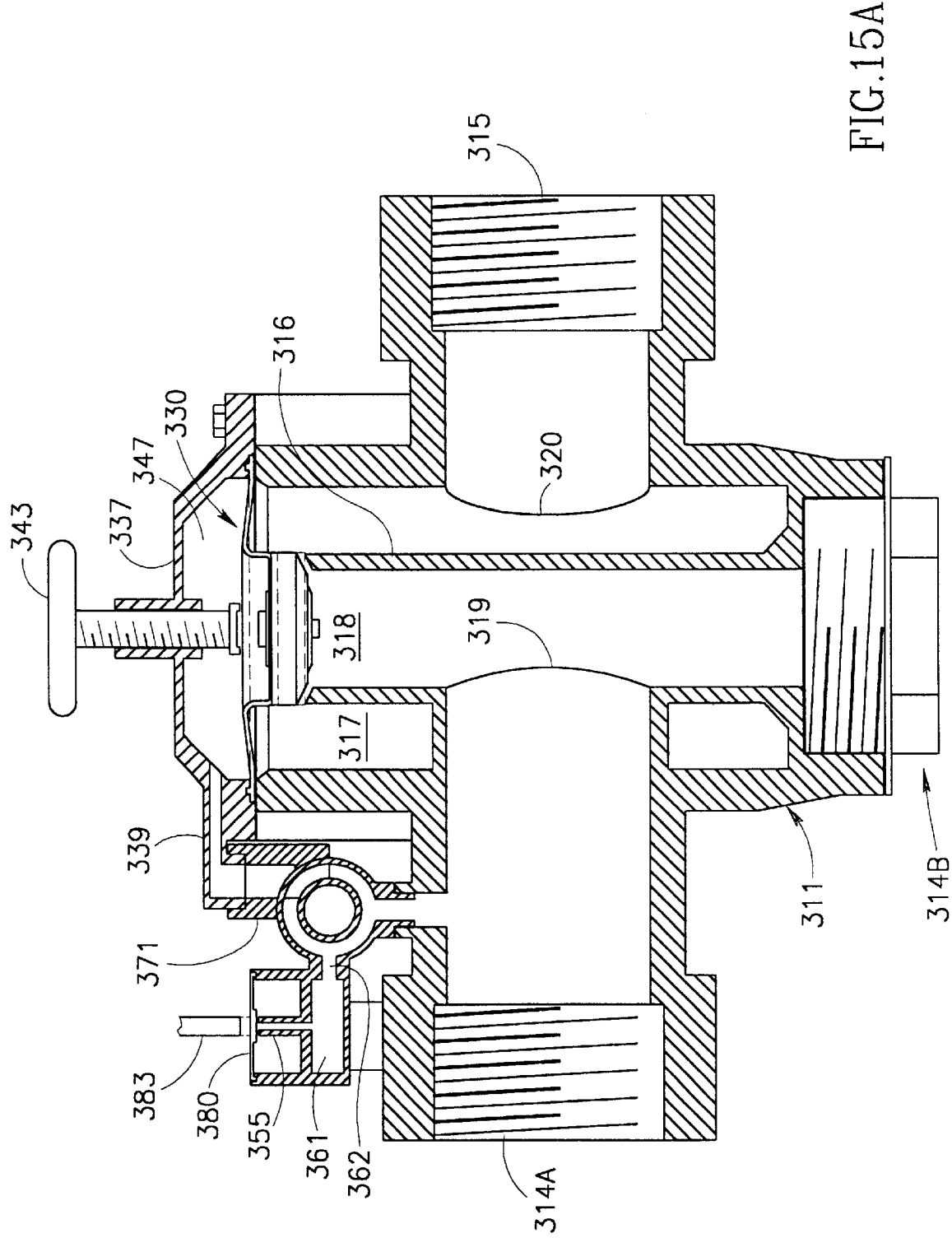
FIG. 15 consists of FIGS. 15a, 15b, and 15c which are schematic longitudinally sectioned views of the valve taken respectively through a first nozzle, a central aperture and a second nozzle with displaceable valve components shown in fill lines in a closed valve position and in broken lines in an open valve position.
Figure 15B:
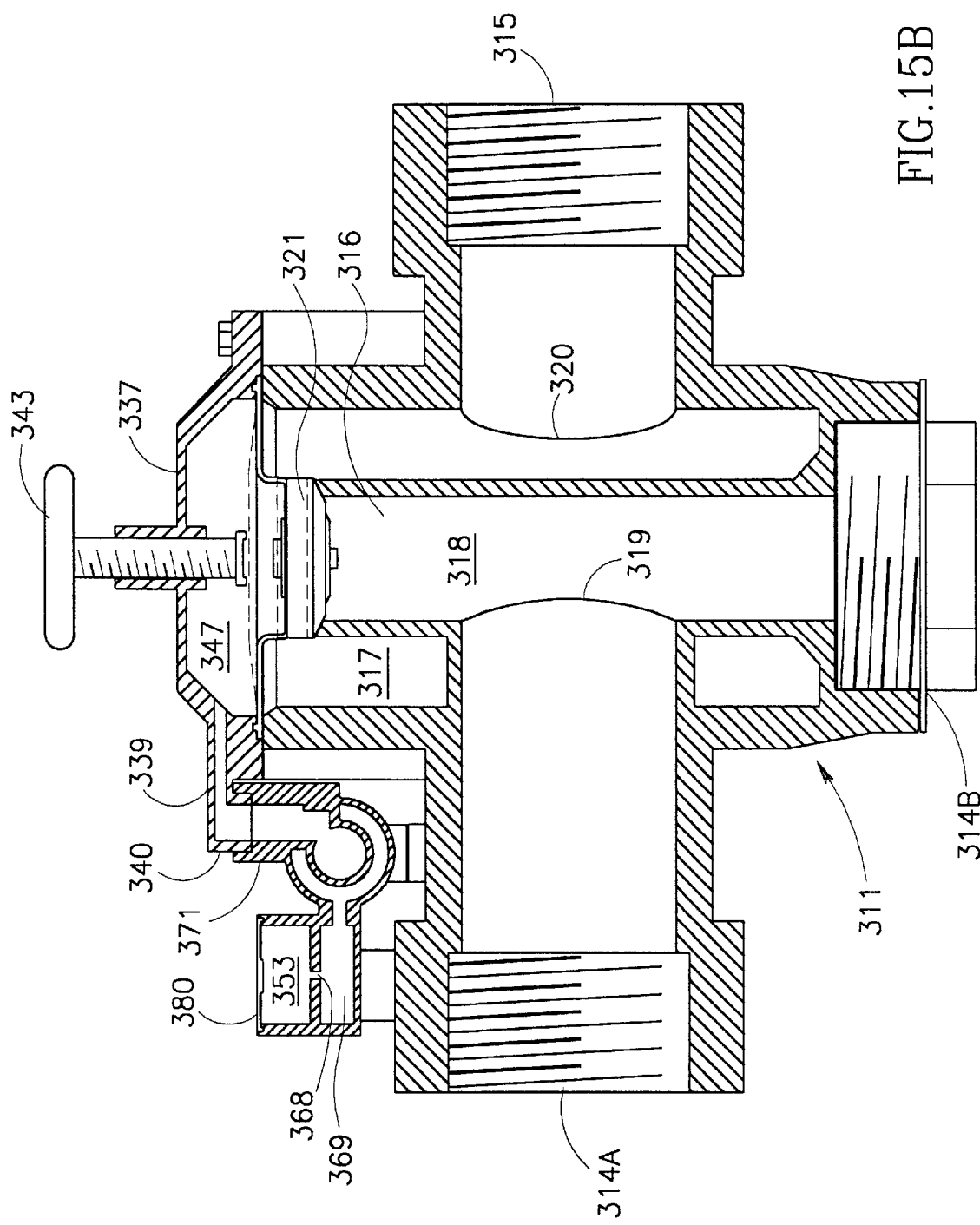
Figure 15C:
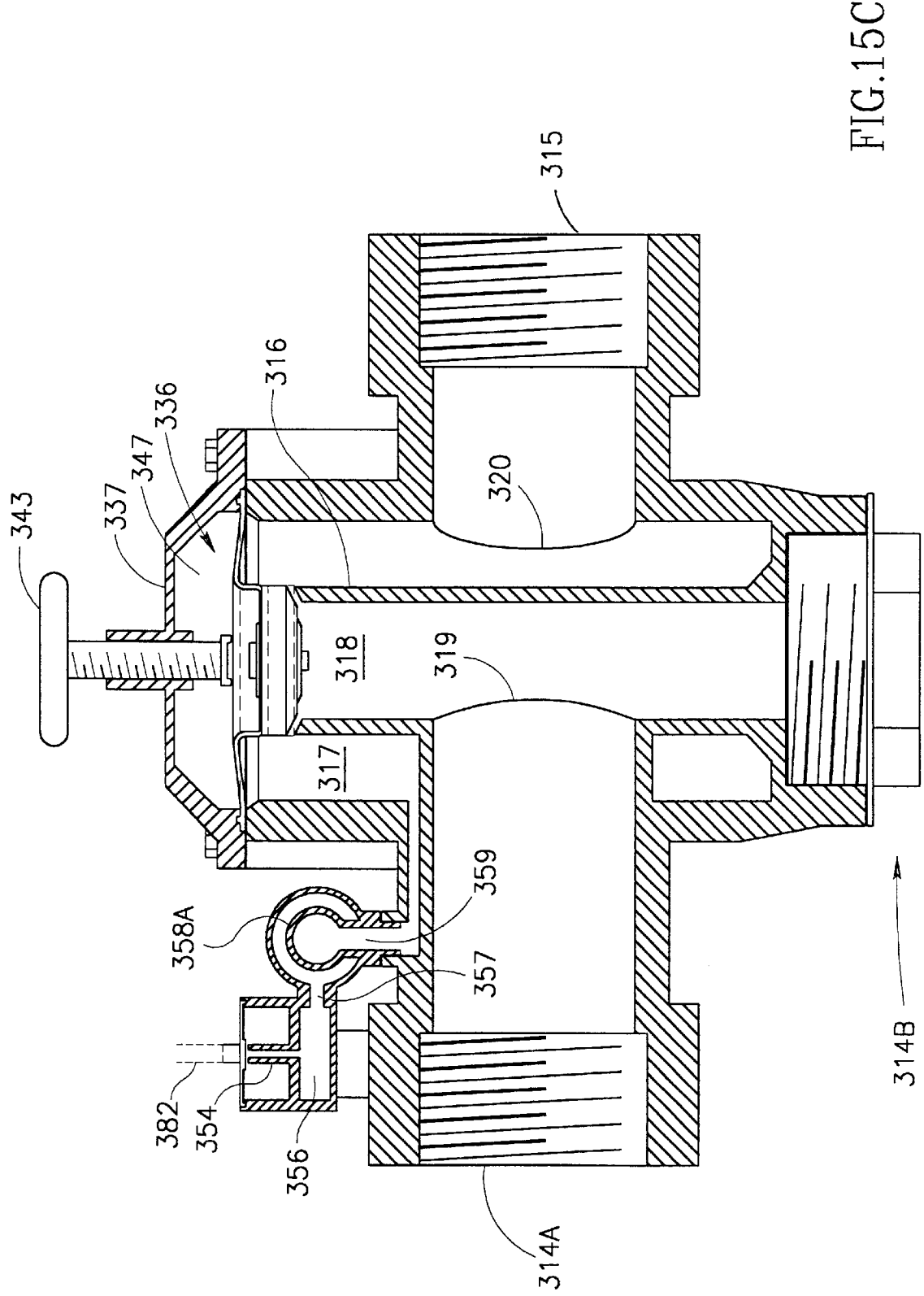

Utilizing the electrically operated selective biasing means 381, opening of the valve is effected by having the second abutment member 383 displaced downwardly onto the command diaphragm 380 into a position as shown in broken lines in FIG. 15a so as to seal off the second nozzle 355 whilst at the same time, the positioning of the first abutment member 383 is such that the first nozzle 354 remains open. Water is thereupon free to flow from the valve control chamber 347, into the command well structure 353. From the well structure 353 and, as seen in FIG. 15c, the water passes through the open fuse nozzle 354, the first transverse passage way 356, the first enclosure 358, the first communicating duct 359, the first coupling parts 360 and 324, the communicating duct 326 and into and out of the outlet-chamber 316 and valve outlet 315. Thus, the valve control chamber 346 is effectively vented thereby allowing for the upward displacement of the main sealing diaphragm 330 into its broken line position, as seen in FIG. 15c and the consequent opening of the valve.

In order to close the valve, a reverse procedure takes place and the first abutment member 382 is displaced downwardly, into a position shown in full lines in FIG. 15c, onto the command diaphragm 380 so as to seal off the first nozzle 354 whilst leaving the second nozzle 355 open. Water will thereupon flow from the valve inlet 314 through the second coupling port 325, the second enclosure 363, the second communicating duct 362, via the open second nozzle 355 into the well structure 353 and from these via the central aperture 368, the third transverse passage way 369, the third communicating duct 370, the second enclosure 363, the third coupling port 371, the coupling boss 340 into the control chamber (as seen in FIG. 15b).

The water pressure thus developed in the control chamber 346 results in the downward displacement of the main sealing diaphragm 330 into its full line position and the consequent closure of the valve.

Figure 13:
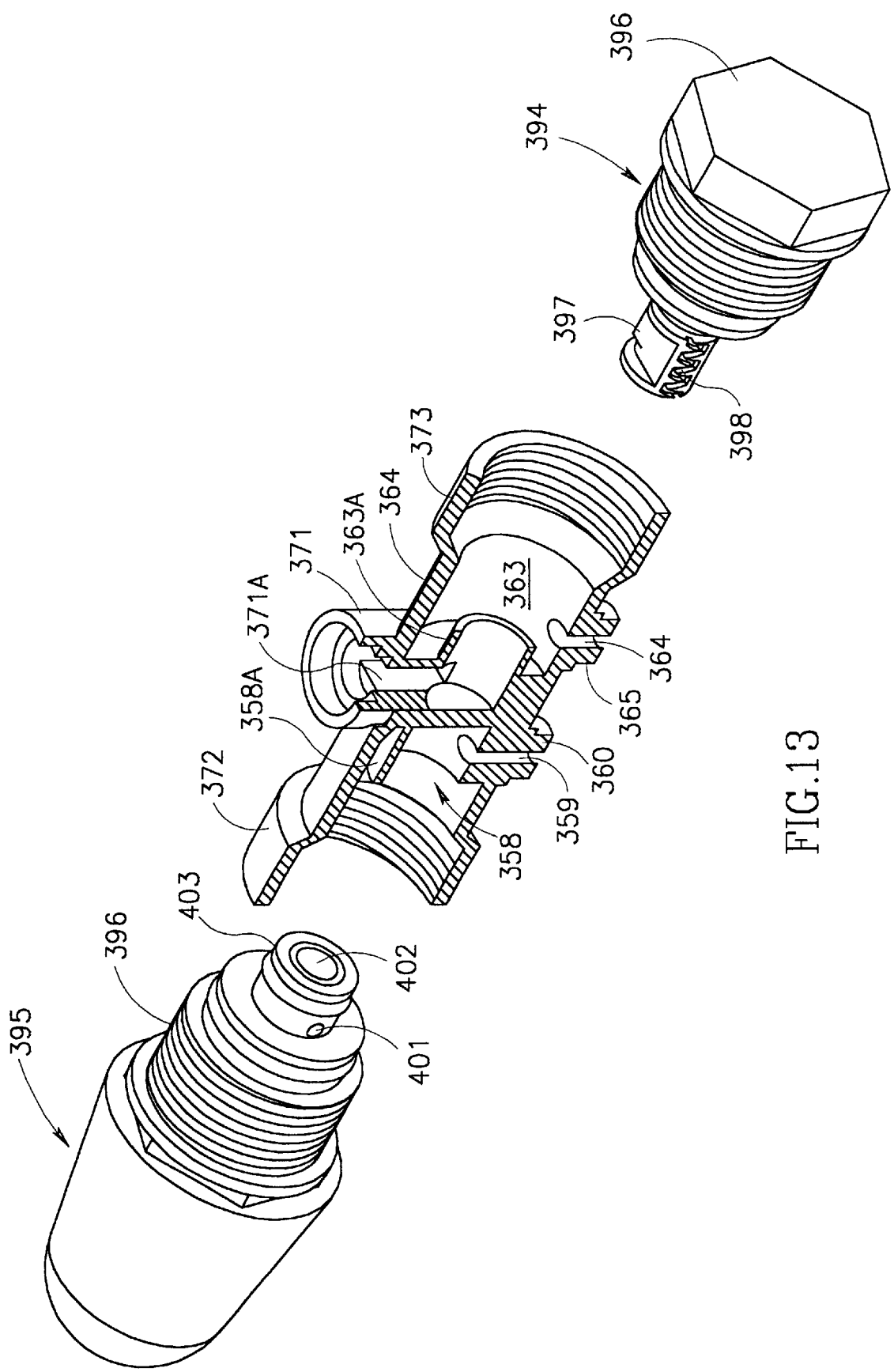
FIG. 13 is a longitudinally sectioned perspective view of the command module with flow rate and pressure control sealing plugs thereof shown detached.
Figure 14:
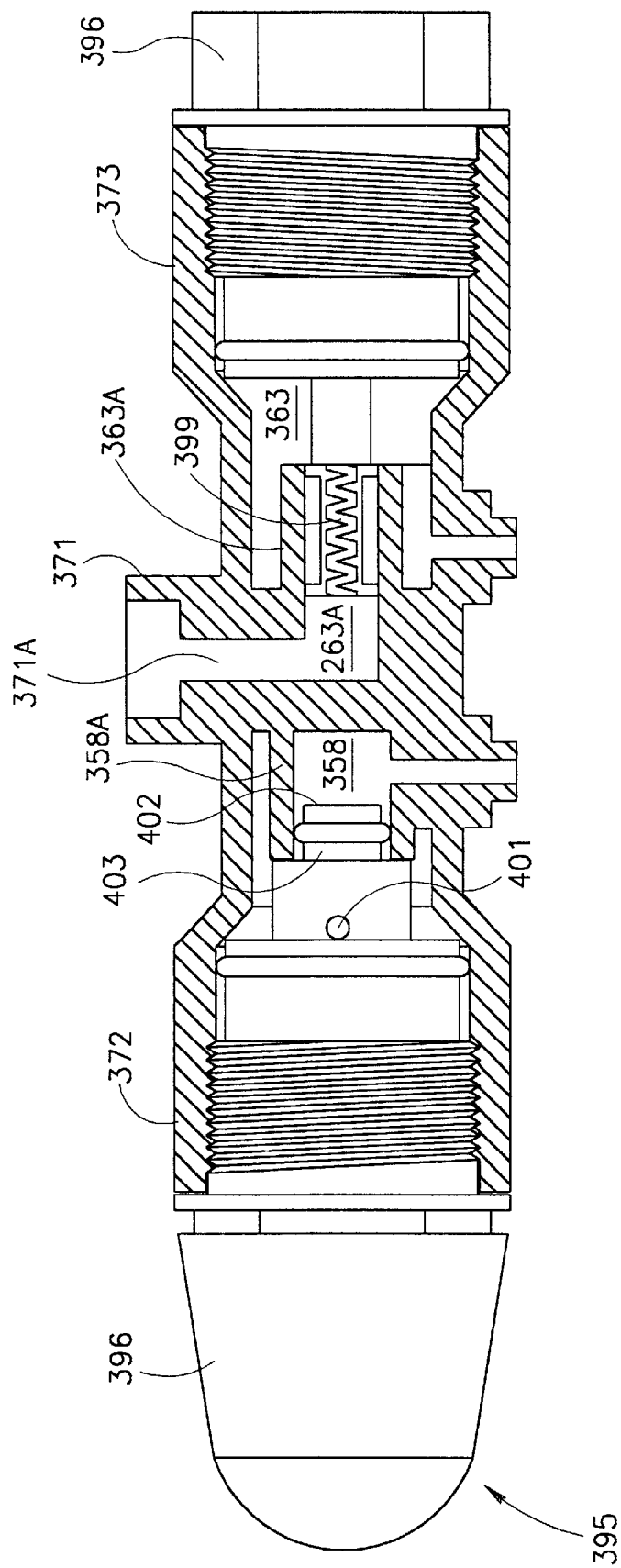
FIG. 14 is a longitudinally sectioned view of the module shown in FIG. 13 when assembled.

As previously stated, the command module housing 351 is formed, (for technical considerations) with open-ended portions 372 and 373. Instead of merely sealing these portions with the sealing plugs 374 and 375, there can be screw fitted in these portions 372 and 373, as shown in FIG. 13 and 14 of the drawings flowrate and pressure control plugs 394 and 395.

The flow rate control plug 394 is formed with a screw threaded head portion 396 and a centrally projecting portion 397 having formed thereon a labyrinthine groove 398. As seen in FIG. 14 of the drawings, when the flow rate control plug 394 is screw fitted into the open ended portion 372, the projecting portion 397 fits tightly within the second central tubular portion 363a communicating with the third coupling port 371 so as to define therewith a labyrinthine path 399.

The pressure control plug 395 is of conventional construction having a water flow inlet 401 and a water flow 402 located at a free end of a projecting portion 403 which is sealingly fitted within the first central tubular portion 358a. Water can flow through the pressure control plug 395 from the inlet 401 to the outlet 402 against a variable biasing resistance whose magnitude determines the pressure of the water outflow.

Thus, and in operation, at all times, i.e. whether the valve is open or closed, water can flow from the valve inlet 314A, through the second coupling ports 325, the communication duct 364 into the second enclosure 363. From here water passes through the labyrinthine path 399 and into the second, central tubular enclosure 358a and from there, via the third communicating duct 370, the third coupling port 371, the coupling boss 340, the communicating duct 341 into the valve control chamber 346.

When the valve is open, the second nozzle 355 is closed and the first nozzle 354 is open, and the valve control chamber 346 in addition to communicating with the valve 314 via the flow rate reducing labyrinthine path 399 also communicates via the open first nozzle 354, the first enclosure 358 and the pressure control plug 385 with the valve outlet 315. In this way it is ensured that the pressure in the upper valve chamber 346 is kept substantially constant at a value determined by the setting of the pressure control plug 395. The pressure in the valve control chamber 348 controls the degree of displacement of the valve sealing diaphragm 330 and therefore the water outflow pressure of the valve.

In this way the command module 350 as described and in accordance with the invention can be readily used to ensure that the valve, to which it is fitted, has an output whose pressure is substantially invariant despite variations in the inflow pressure.

It will be appreciated however, that the functioning of the module 350 in order to provide pressure control when fitted with the flow rate and pressure control plugs 394 and 395 is dependent on the provision of an auxiliary flow path from the valve inlet 314 to the valve control chamber 347 which is effective, during the opening of the valve, to allow for the flow, at a reduced, controlled rate of water to the valve control chamber 347. This auxiliary flow pathway passes through the second central tubular portion 363a to the third coupling port 371.

When however pressure control is not required or is not provided for and the flow rate and pressure control plugs 394 and 395 are replaced by the simple sealing plugs 374 and 375 it is necessary to ensure that this auxiliary flow path is sealed off. To this end, and as can be readily seen in FIGS. 11 to 12 of the drawings, the sealing plug 375 is formed with a central projection 376 which sealingly fits into the second central tubular portion 363a.

Figure 16:
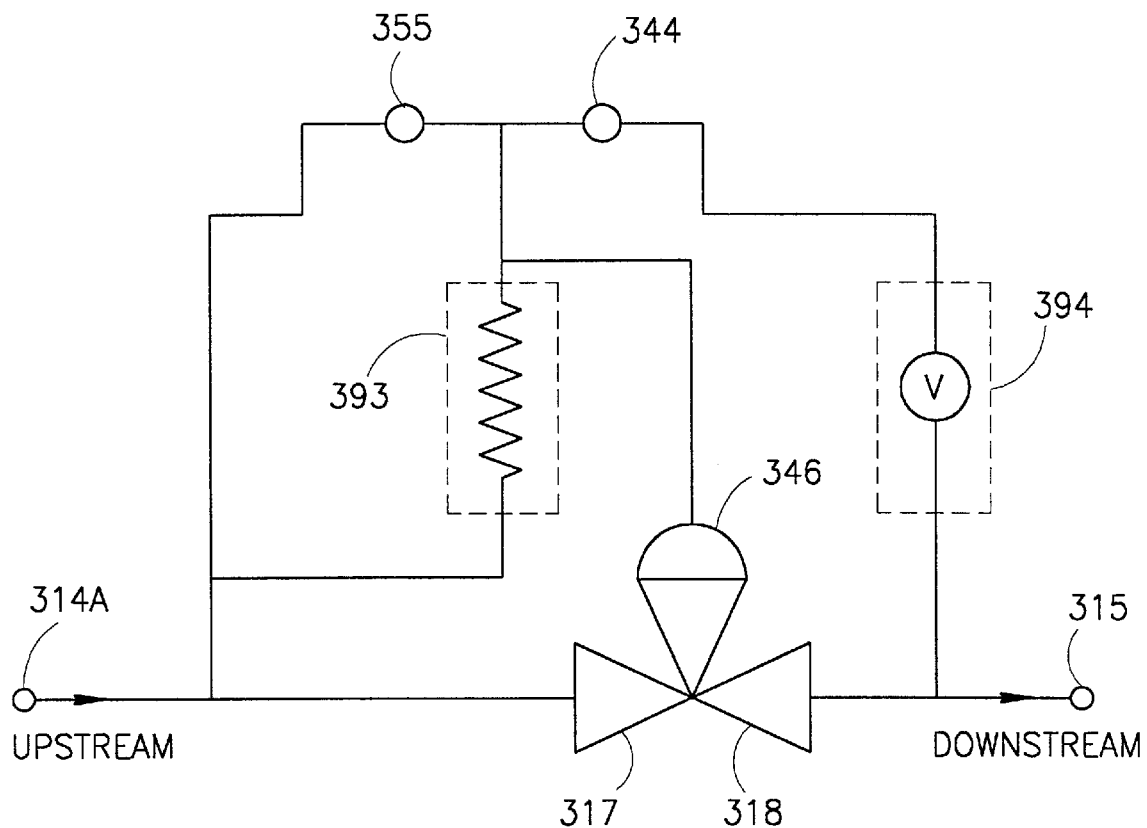
FIG. 16 is a schematic flow diagram illustrating the mode of operation of the valve.

A schematic representation of the operation of the valve with and without provision for pressure control is shown in FIG. 16 of the drawings. As can be seen, the provision of the flow rate control plug 394 and its associated flow path is shown in dotted lines, as is the pressure control plug 395. With the valve open, the first nozzle 354 is open whilst the second nozzle 355 is closed. The valve control chamber 347 is coupled to the downstream outlet 315 via the open first nozzle 354 and the pressure control plug 395. Water passes from the inlet 314a via the flow rate reducing plug 394 to the valve control chamber 347 and the pressure therein is regulated by the preset pressure control plug 395 so that the position of the valve sealing diaphragm 330 which controls flow between the valve inlet and outlet chambers 317 and 318 is kept at a level such as to ensure that water outflow from the valve is always substantially at a predetermined pressure.

When, however, the flow rate and pressure control plugs 394 and 395 are replaced by the simple sealing plugs 374 and 375, the dotted line portions of the diaphragm are simply removed and the valve operation without pressure control.

As explained hereinabove in connection with the specific embodiments of FIGS. 1 to 7, the command diaphragm 227 extends over well structure 218 formed in the housing block 211 engageable by a pair of toggle-operated first and second abutment members 239 and 240 displaceable responsive to biasing means 238.

Biasing means 238 is a toggle member 400 formed with two laterally extending lever arms 401 and 402. The toggle member 400 is rotatable about a pivot axis 404 with an upwardly depending armature 406 and 410, defining therebetween a substantially U-shaped cavity 416, in which there is disposed a cylindrical boss 420 eccentrically mounted on a first end 424 of crank 428, having a second end 430 disposed within an arcuate slot 432 of a large gear wheel 434.

Figure 17A:
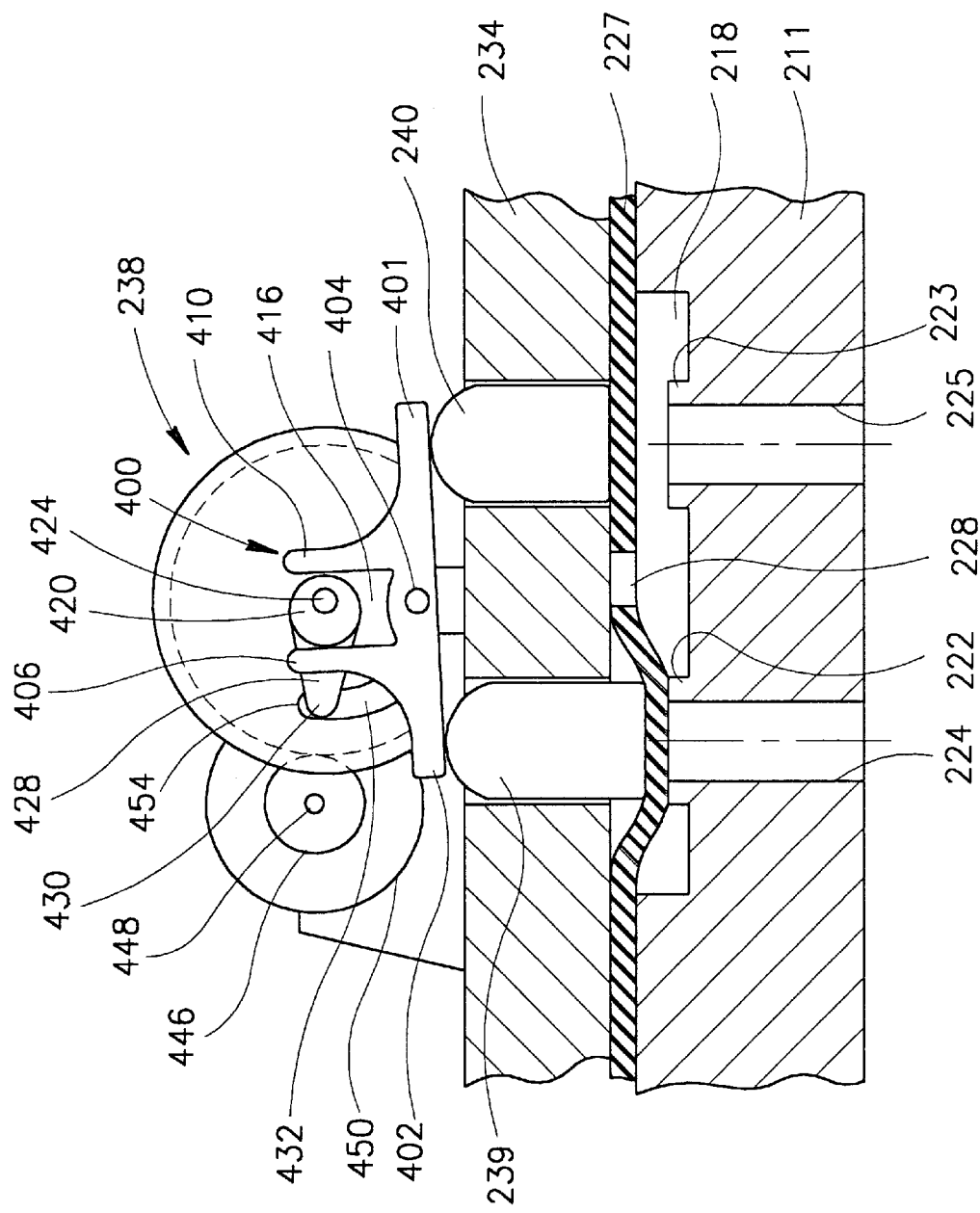
FIG. 17 consists of FIGS. 17a and 17b which illustrate a motor-operated toggle mechanism for use in association with a diaphragm valve in accordance with the present invention.
Figure 17B:
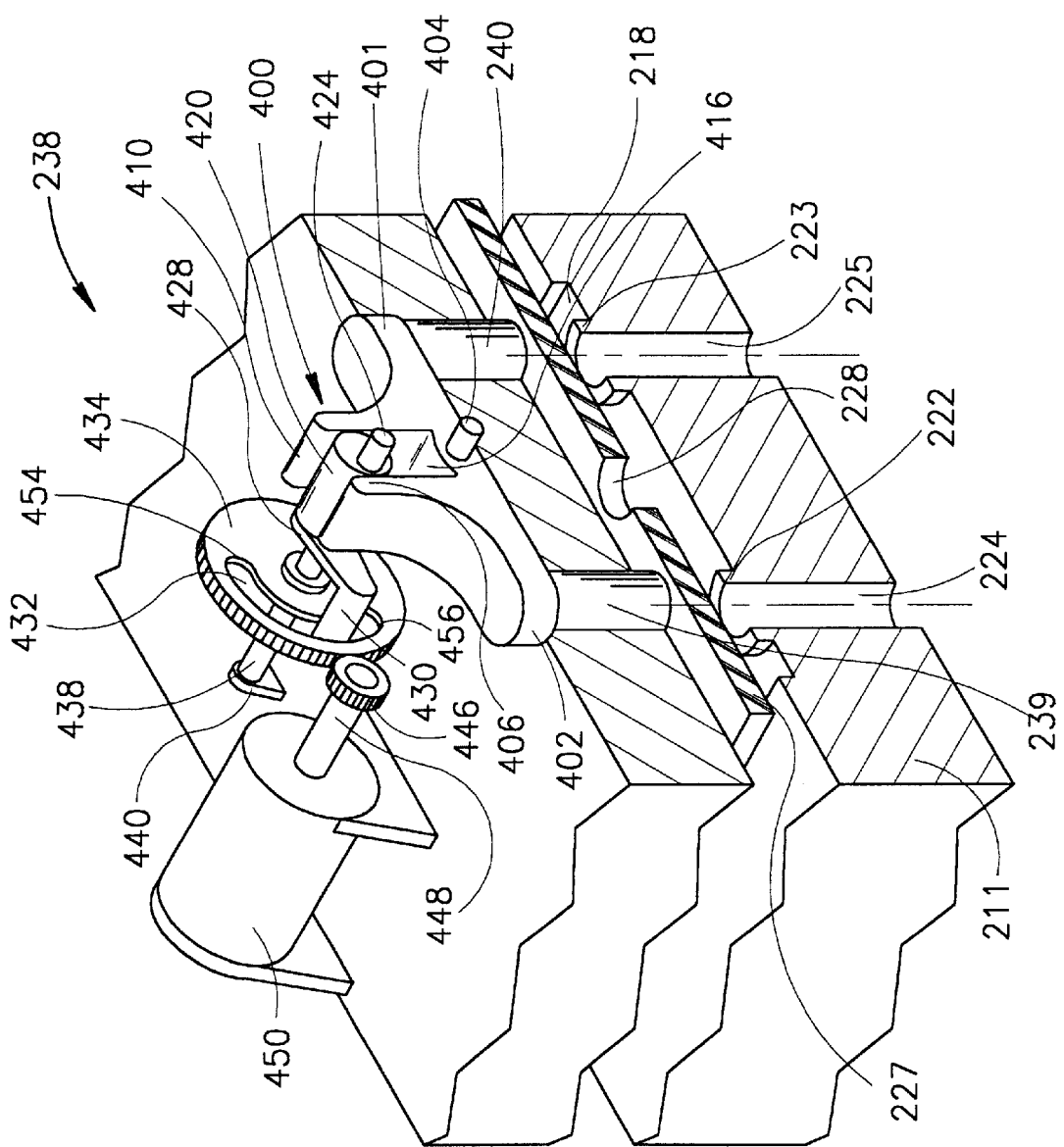

Gear wheel 434 is adapted for rotation about a central pivot axis 438, the latter supported between support members 440 (only one seen in FIG. 17b). Gear wheel 439 is engaged with a pinion gear 446 rotatably by shaft 448 to an electric motor 450.

The arrangement is such that consequently, as the gear wheel 434 rotates, one end 454 or 456 of the arcuate slot 432 (depending on the direction of rotation of the electric motor 450) impinges on the second end 430 of the crank 438, thereby rotating the crank and with it the cylindrical boss 420. Owing to the eccentric rotation of the latter within the armatures 406 and 410, there is imposed a lateral force on the inside surface of one of the armatures, thereby rotating the toggle member 410 about its pivot axis 424, with the consequence of displacingly bearing one of the abutment members 239 and 240 and allowing the other abutment member to displace in an opposite direction, respectively.

Figure 18A:
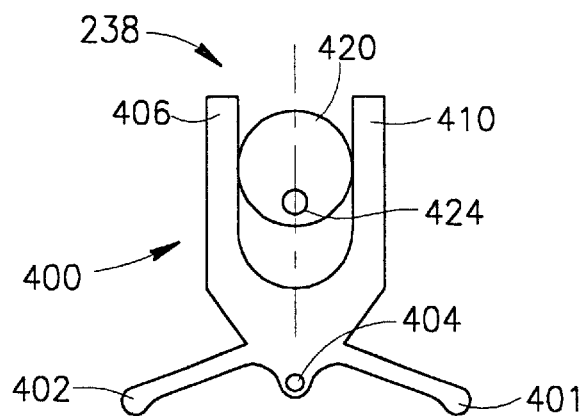
FIG. 18 consists of FIGS. 18a, 18b and 18c which show a detailed of the toggle member illustrated in FIG. 17.
Figure 18B:
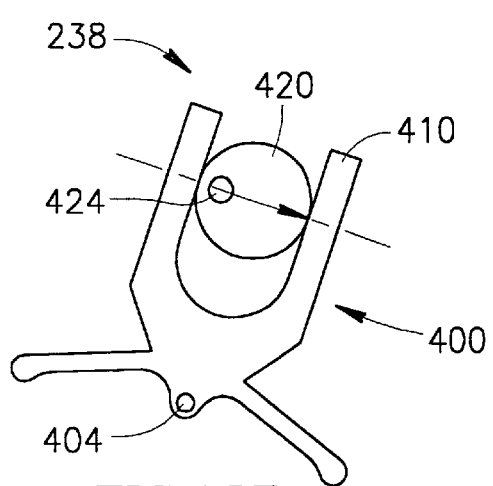
Figure 18C:
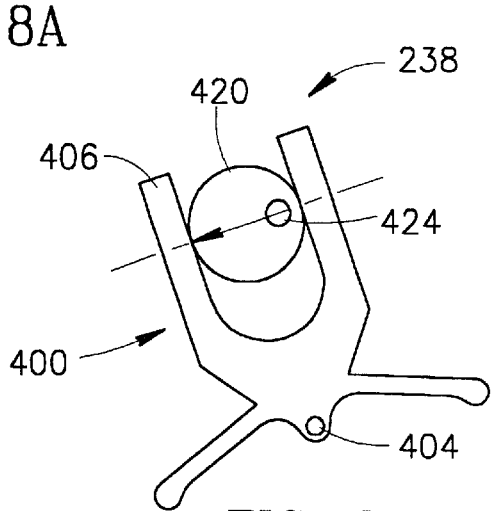

FIGS. 18a–18c schematically illustrate a detail of the toggle mechanism 238 in responsive intermediate, open and closed positions of the valve, respectively. In this intermediate position shown in FIG. 18a, the axis joining the center of the cylindrical boss 420 to the first end 424 of crank 428 passes through the pivot axis 404 of the toggle member 400.

In the situation of FIG. 18a, any natural tendency for the toggle member 400 to rotate in either direction, imparts a turning moment to the toggle member 400, since the turning axis of the toggle member, corresponding to the first end 424 of the crank, is displaced from the point of the armatures 406 and 410 of the toggle member. In this position, lever arms 401 and 402 are in neutral position, the consequence of which is that neither of abutment members 239 and 240 are sealingly displaced into sealing engagement of inlets 224 and 225, respectively.

In the open position shown in FIG. 18b, the armature 410 imparts a force to the cylindrical boss 420 passing through the first end 424 of the crank 428 (FIG. 17b). Likewise, in the closed position shown in FIG. 18c, the armature 406 imparts a force to the cylindrical boss 420 passing through the first end 424 of the crank. In either of these situations, any tendency for the toggle member to counter-rotate, so as to close or open the valve, is prevented, because the only force acting on the cylindrical boss acts through the first end 424 of the crank, about which the cylindrical boss rotates.

Figure 19:
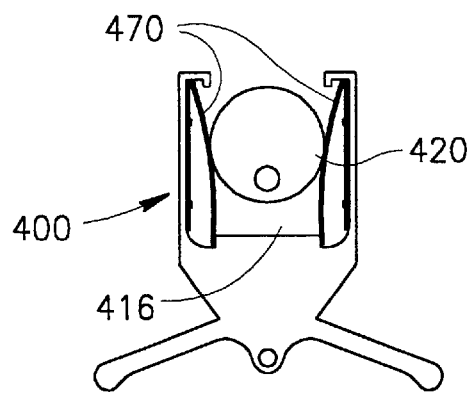
FIG. 19 shows a further detail of the toggle member illustrated in FIGS. 17.

Referring now to FIG. 19, it is seen that the toggle member 238 further includes pair of resiliently biased leaf spring members 470 within the U-shaped cavity 416 such that an initial rotation of the motor 450 (see FIG. 17b) depresses the cylindrical boss 420 against one of the left spring members 470, thereby rotating the toggle member 400 into the first and second position, respectively. Continued rotation of the motor causes the cylindrical boss 420 to depress a respective left spring member 470 whilst not imparting any further rotation on the toggle member 400. In such an arrangement, the toggle member 400 is at least partially formed of molded plastics, the leaf springs 470 being also formed of plastics (or alternatively of metal).

Figure 20:
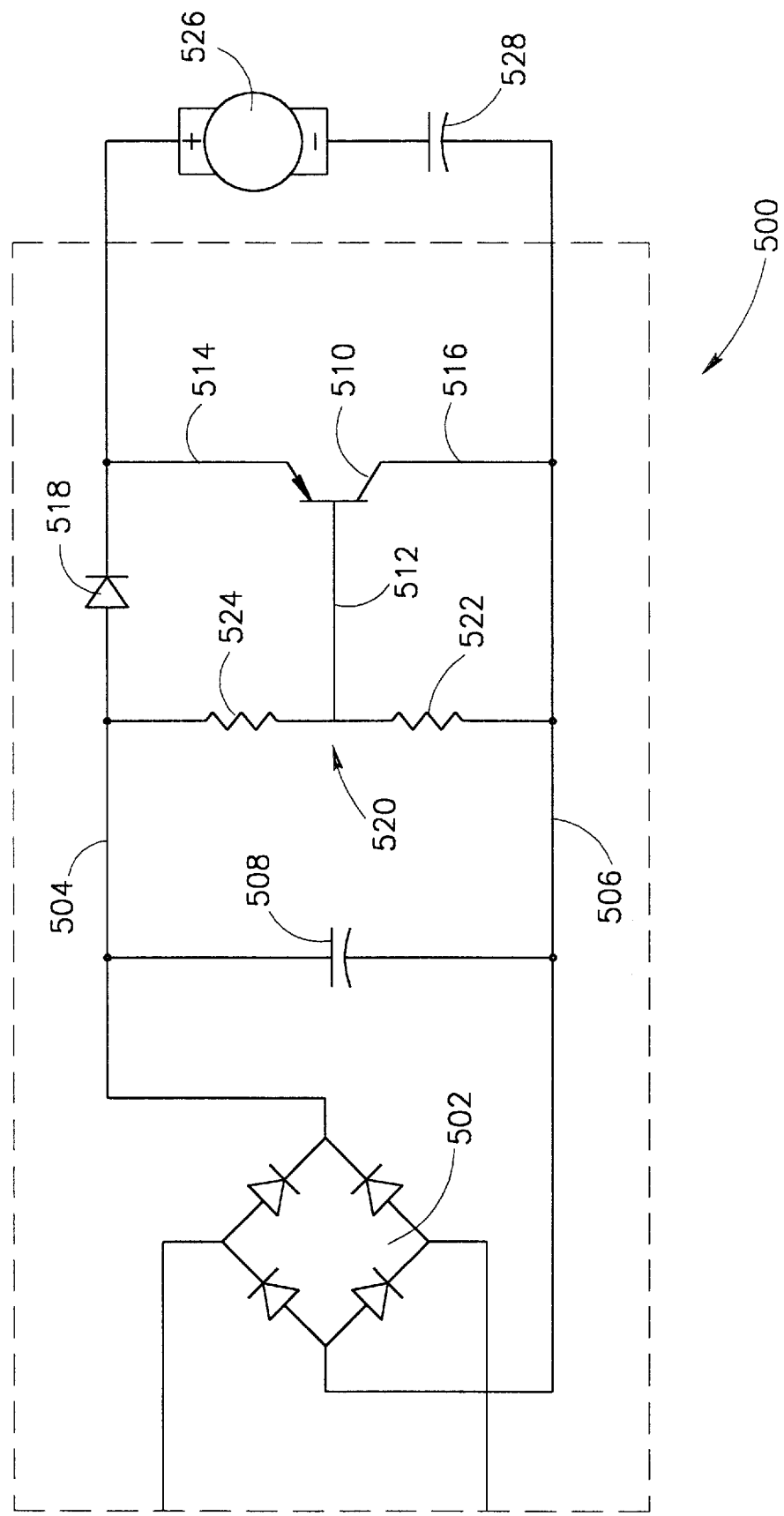
FIGS. 20 to 23 are schematic diagrams of a switching circuitry for use with the valve is accordance with the present invention, in accordance with a first, second, third and fourth embodiment, respectively.

Referring now to FIG. 20, there is shown a first embodiment of a switching circuit 500 for use with any of the electrical valves described in detail hereinabove.

Thus, there is provided a full wave bridge rectifier 502 connected in conventional form to a source of a.c. power (not shown) so as to produce a rectified d.c. output across a positive supply rail 504 and a negative supply rail 506. Connected across the positive and negative supply rails 504 and 506 is a smoothing capacitor 508 for reducing any a.c. ripple associated with the rectified d.c. output of the bridge rectifier 502.

Also connected across the positive and negative supply rails 504 and 506 is a PN bipolar junction transistor 510 having base emitter, and collector terminals 512, 514 and 516, respectively, connected as a darlington pair. The transistor 510 is connected in common collector configuration such that its collector 516 is connected to the negative supply rail 506 and its emitter terminal 514 is connected to the positive supply rail 504 via a double 518 and into the collector 516 of the transistor 510 whilst blocking the flow of current through the diode 518 in a reverse direction.

Also connected across the positive and negative supply rails 504 and 506, is a voltage divider depicted generally as 520 and comprising a pair of resistors 522 and 524, a common junction of which is connected to the base 512 of the transistor 510. The values of the resistors 522 and 524 are so chosen that minimal current flows through the voltage divider 520 whilst nevertheless permitting sufficient current to flow into the base 512 of the transmitter 510 so as to turn off the PNP transistor 510 thereby substantially eliminating the flow of current from the emitter 514 to the collector 515.

The motor 526 is connected in series with a capacitor 528, the combined motor and capacitor network being connected across the positive and negative supply rails 504 and 506.

The operation of the switching circuit 500 is as follows. When the bridge rectifier 502 is connected to a source of a.c. power, the resulting rectified d.c. voltage appearing across the positive and negative supply rails 504 and 506 renders the PNP transistor 510 open circuit, thereby allowing current in flow through the diode 518 and the motor 526 so as to charge the capacitor 528. At the same time, a small current flows through the voltage divider 520 although, as explained above, the values of the resistors 522 and 524 are chosen such that this leakage current is insignificant.

Referring back to FIGS. 17a and 17b, owing to the gear ratio between the pinion gear 446 and the gear wheel 434, the motor (450 in FIG. 17, 426 in FIG. 20) effects several revolutions before the arm 430 abuts a respective end of groove 432, the time interval during which such rotation of the motor occurs being sufficiently long substantially to fully charge the capacitor 528. Once the capacitor is fully charged, it blocks the flow of d.c. current so that although a voltage remains across the motor terminals, no current actually flows through the motor.

On decoupling the rectifier 502 from the a.c. supplier source, no current flows into the base 512 of the transistor 510 and it is therefore turned on, acting as an effective short-circuit across the series connected motor (526 in FIG. 20) and capacitor 528. In this configuration, current flows from the capacitor 528 through the motor in the opposite direction to the original charging current, thereby driving the motor in the reverse direction until the arm 430 encounters an opposite end of the groove 432 at the opposite extremity thereof.

During such discharge of the capacitor 528 through the motor, the diode 518 prevents the discharge current from flowing through the voltage divider 520, thereby ensuring that the rate of discharge of the capacitor 528 is determined only by the collector emitter impedance of the transistor 510 and the valve of the capacitor 528.

In such a configuration, the transistor 510 functions as a normally closed switching element, which opens as soon as the bridge rectifier 502 is connected to an a.c. supply source and closes as soon as the base bias voltage is reduced to zero.

It is desirable that steps are taken to ensure that the capacitor 528 is always substantially fully charged whenever the valve is open or even partially open, so that in the even of a subsequent power failure, for any reason, there is always sufficient charge in the capacitor 528 to drive the motor 526 so as to urge the toggle mechanism into the closed position as explained hereinabove. If, on the contrary, the valve were opened, either wholly or partially, before the capacitor 528 had fully charged and a power failure then occurred, it might possibly happen that there would be insufficient residial charge in the capacitor 528 to rotate the motor through a sufficient number of turns, so as to seal the valve completely.

Figure 21:
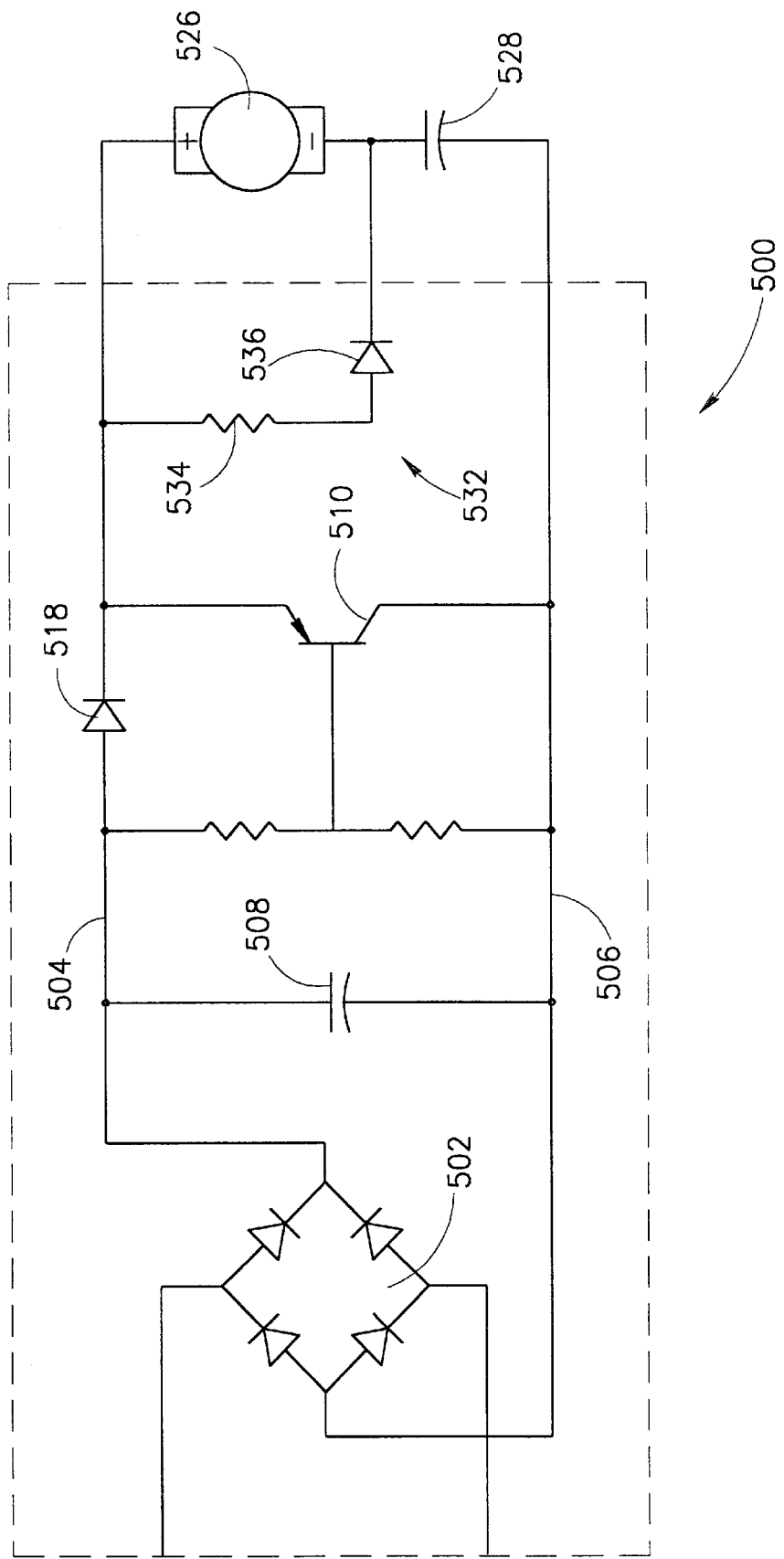

FIG. 21 illustrates a second embodiment of the switching circuitry 530 wherein additional components are included in order to prevent such an occurrence. The switching circuit shown in FIG. 21 is substantially identical to that described above with reference in FIG. 20 with the sole exception of the provision of a secondary charge PNP 532 connected across the motor 521 and comprising a resistor 534 in series with diode 536.

When the bridge rectifier 502 is connected to a source of a.c. power, the resulting rectified d.c. voltage across the positive and negative supply rails 504 and 506 renders the transistor 510 open circuit, whilst allowing current to flow through the diode 518 and the motor 526 in series with the capacitor 528 as well as through the secondary charge path 532 and the capacitor 528. Thus, the secondary charge path 532 acts as a bi-path for ensuring that more current flows through the capacitor 528 than flows through the motor 526. By such means, it may be arranged that the capacitor 528 charge at a greater rate than the motor 526 is able to rotate. It may thus be ensured that, even in the even of a power failure during the opening of the valve, there is always sufficient residual charge in the capacitor 528 to at least rotate the motor 526 sufficiently so as to restore the scaled static of the valve. The diode 536 ensures that discharge current from the capacitor 528 flows only through the motor 526 and not through the secondary charge path 532.

Figure 22:
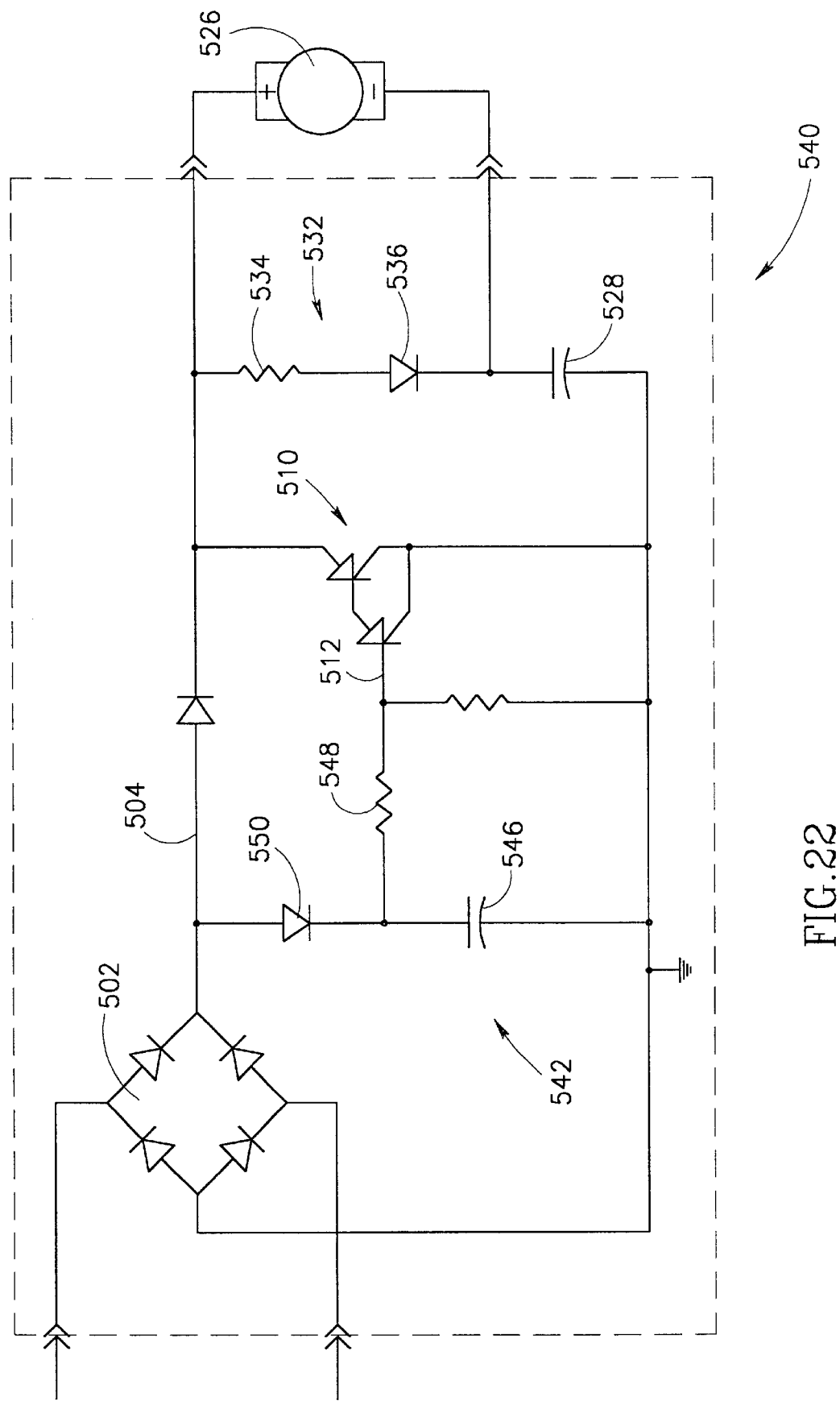

Referring now in FIG. 22, there is shown a third embodiment of the switching circuit 540 similar to principle to the second embodiment described above with reference to FIG. 21 of the drawings and therefore identical reference numerals will be used in respect of those circuit elements which are common to both embodiments. As will be seen from FIG. 22, no smoothing capacitor is connected across the positive and negative supply rails 504 and 506, respectively, and, consequently, the output from the bridge rectifier 502 is a continuous sequence of half sine waves corresponding to the rectified a. c. voltage input. Where such a voltage allows to appear across the base 512 of the PNP transistor 510, then the transistor would stop conducting current during those periods of the a.c. cycle when the voltage across its base 512 fell below the base threshold voltage $V_T$. This must not be allowed to occur because when the PNP transistor 510 stops conducting, (i.e. becomes open circuit), the capacitor 528 will start to conduct through the motor via the secondary path 532 constituted by the resistor 534 in series with the diode 536, thereby rotating the motor 526 and hanging the state of the valve. In order to avoid this, the voltage appearing on the base 512 of the PNP transistor 510 must be maintained at least at the base threshold voltage $V_T$.

Figure 23:
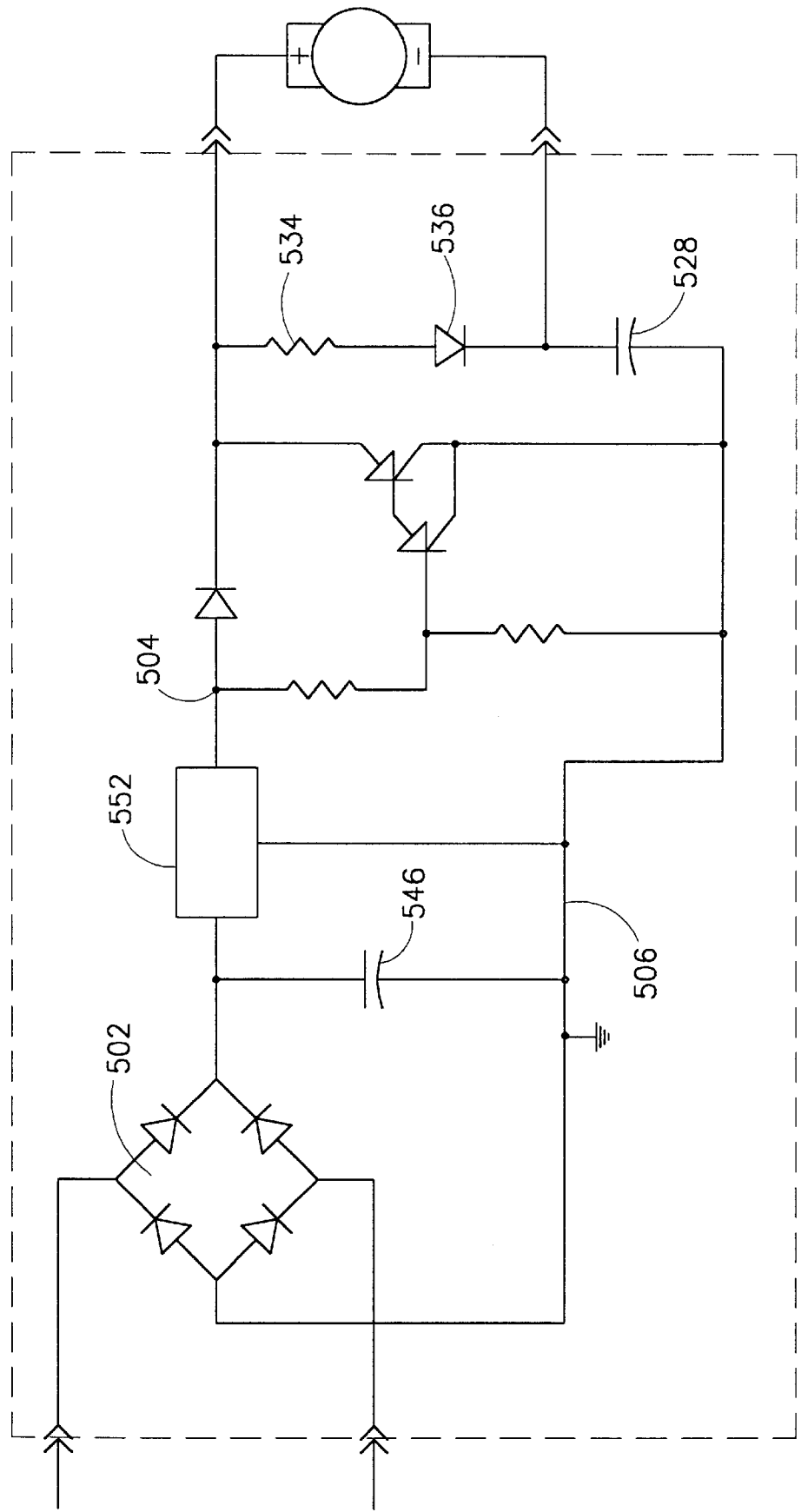

The third and fourth embodiments shown in FIGS. 22 and 23 show alternative ways in which this is achieved. Thus, in FIG. 18 there is provided a small filter designated generally as 542 and comprising a 546 having one terminal connected to the negative supply rails 506 and having a second terminal connected to the base 512 of the PNP transistor 510 via a resistor 548. The point of connection of the capacitor 546 with the resistor 548 is connected to the positive supply rail 504 via a rectifier diode 550 which allows the passage of current from the positive supply rail 504 through the capacitor 542 to the negative supply rail 506 but does not allow current to flow through the capacitor 542 in a reverse direction.

The current operates as follows. As soon as an a.c. voltage supply is connected to the bridge rectifier 502 the capacitor 546 substantially immediately reaches full charge owing to the small time constant of the capacitor/diode combination constituted by the capacitor 546 in series with the rectifier diode 550. Any ripple appearing on the voltage across the capacitor 546 is significantly reduced by the filter 542 such that an acceptably ripple-free voltage appears across the base 512 of the PNP transistor 510 of sufficient magnitude to put the PNP transistor 510 into saturation. At the same time, the capacitor 546 is prevented from discharging to the positive supply rail 504 owing to the rectifier diode 550.

In FIG. 23 a similar arrangement is employed except that instead of using a filter, there is provided a small smoothing capacitor connected across the positive and negative outputs of the bridge rectifier 502 which achieves a small reduction of the ripple appearing across the d.c. rectified voltage although the remaining ripple is still very much greater than that achieved in either of the first or second embodiments both of which employ a comparatively large smoothing capacitor. The positive output of the bridge rectifier 502 is then connected to the positive supply rail 504 through a voltage regulator 552 which reduces the magnitude of the d.c. voltage and, at the same time, regulates it so that the voltage appearing across the positive and negative supply rails 504 and 506 respectively, is substantially constant.

It will be understood that whether a large smoothing capacitor is employed or, alternatively whether a filter or a voltage regulator is employed are questions dictated largely by cost rather than technical considerations. Thus, in the first and second embodiments shown in FIGS. 20 and 21, respectively, the smoothing capacitor 508 typically has a value of 1000 $\mu$F as compared with the magnitude of the filter capacitor 546 in the third embodiment (FIG. 22) which typically has a value of only 1 $\mu$F. On the other hand, the third embodiment requires the additional rectifier diode 550 and the resistor 548. The third embodiment employs a capacitor 556 of intermediate size typically having a value of 4.7 $\mu$F but, of course, requires also the regulator 552 which is relatively expensive.

What is claimed is:

1. A hydraulic diaphragm valve comprising:

a main valve housing having a valve inlet and a valve outlet; a diaphragm valve seating formed in said housing and located in a flow-path between said inlet and said outlet; a sealing diaphragm mounted in said housing and displaceable towards and away from said diaphragm valve seating so as to close and open said flow path; and a valve control chamber defined between said sealing diaphragm and said housing outside said flow-path;

a command valve module associated with said valve housing including a first duct communicating at one end thereof with said valve inlet and at an opposite end thereof with a first command valve seating; a second duct communicating at one end thereof with said valve outlet and, at an opposite end thereof with a second command valve seating; a third duct communicating at one end thereof with said valve control chamber and, at its opposite end selectively with said first and second command valve settings, a flexible command diaphragm juxtaposed with respect to said first and second command valve seatings; and selectively actuatable biasing means for selectively biasing said command diaphragm into seating engagement with either one of said command valve seatings so as selectively to effect communication between said third duct and the command valve seating not in seating engagement with said command diaphragm;

said command valve module;

further comprising a command well structure having located therein said first and second command valve seatings, said command diaphragm being positioned in a mouth portion of said well structure so as to overlie said command valve seatings.

2. A hydraulic diaphragm valve according to claim 1, wherein said command well structure is formed in a separate command valve housing there being provided means for mechanically and hydraulically coupling the command valve housing to said valve housing and wherein said third duct communicates with an aperture formed in said well structure and via a coupling port formed in said command valve module.

3. A hydraulic diaphragm valve according to claim 2, wherein said command housing is formed with first and second enclosures.

4. A hydraulic diaphragm valve according to claim 3 wherein associated with said enclosure are pressure control means for ensuring a substantially constant pressure outflow from said valve.

* * * * *

UNITED STATES PATENT AND TRADEMARK OFFICE
CERTIFICATE OF CORRECTION

PATENT NO. : 6,394,412 B2
DATED : May 28, 2002
INVENTOR(S) : Zakai et al.

It is certified that error appears in the above-identified patent and that said Letters Patent is hereby corrected as shown below:

Title page,
Item [57], ABSTRACT,
Line 18, "seating" should read -- sealing --.

Column 4,
Line 2, "portion" should read -- partition --.
Line 46, "22" should read -- 232 --.

Column 7,
Line 17, "ti" should read -- it --.
Line 57, "328" should read -- 320 --.

Column 8,
Line 60, "351" should read -- 352 --.

Column 9,
Line 59, "350" should read -- 330 --.

Column 10,
Line 21, "parts" should read -- ports --.
Line 36, "these" should read -- there --.
Line 49, "FIG" should read -- FIGS --.
Line 61, after "flow" and before "402", insert therein -- outlet --.

Column 11,
Line 13, before "314" insert therein -- inlet --.
Line 15, "385" should read -- 395 --.
Line 19, "348" should read -- 346 --.

Column 12,
Line 32, "responsive" should read -- respective --.
Line 33, "this" should read -- their --.
Line 62, "left" sould read -- leaf --.

Column 13,
Line 22, "double" should read -- diode --.

UNITED STATES PATENT AND TRADEMARK OFFICE
CERTIFICATE OF CORRECTION

PATENT NO. : 6,394,412 B2
DATED : May 28, 2002
INVENTOR(S) : Zakai et al.

It is certified that error appears in the above-identified patent and that said Letters Patent is hereby corrected as shown below:

Column 14,
Line 42, "charge" should read -- charges --.
Lines 46-47, "scaled static" should read -- sealed state --.

Column 15,
Line 2, "hanging" should read -- changing --.

Column 16,
Line 25, "settings" should read -- seatings --.
Line 51, "enclosure" should read -- enclosures --.

Signed and Sealed this

Twenty-second Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,394,412 B2
DATED : May 28, 2002
INVENTOR(S) : Zakai et al.

It is certified that error appears in the above-identified patent and that said Letters Patent is hereby corrected as shown below:

<u>Title page, Item [54] and Column 1, line 1,</u>
Title, should read -- HYDRAULIC DIAPHRAGM --

<u>Title page,</u>
Item [57], ABSTRACT,
Line 18, "seating" should read -- sealing --.

<u>Column 4,</u>
Line 2, "portion" should read -- partition --.

<u>Column 6,</u>
Line 46, "22" should read -- 232 --.

<u>Column 7,</u>
Line 17, "ti" should read -- it --.
Line 57, "328" should read -- 320 --.

<u>Column 8,</u>
Line 60, "351" should read -- 352 --.

<u>Column 9,</u>
Line 59, "350" should read -- 330 --.

<u>Column 10,</u>
Line 21, "parts" should read -- ports --.
Line 36, "these" should read -- there --.
Line 49, "FIG" should read -- FIGS --.
Line 61, after "flow" and before "402", insert therein -- outlet --.

<u>Column 11,</u>
Line 13, before "314" insert therein -- inlet --.
Line 15, "385" should read -- 395 --.
Line 19, "348" should read -- 346 --.

UNITED STATES PATENT AND TRADEMARK OFFICE
CERTIFICATE OF CORRECTION

PATENT NO. : 6,394,412 B2
DATED : May 28, 2002
INVENTOR(S) : Zakai et al.

It is certified that error appears in the above-identified patent and that said Letters Patent is hereby corrected as shown below:

<u>Column 12,</u>
Line 32, "responsive" should read -- respective --.
Line 33, "this" should read -- their --.
Line 62, "left" should read -- leaf --.

<u>Column 13,</u>
Line 22, "double" should read -- diode --.

<u>Column 14,</u>
Line 42, "charge" should read -- charges --.
Lines 46-47, "scaled static" should read -- sealed state --.

<u>Column 15,</u>
Line 2, "hanging" should read -- changing --.

<u>Column 16,</u>
Line 25, "settings" should read -- seatings --.
Line 51, "enclosure" should read -- enclosures --.

This certificate supersedes Certificate of Correction issued October 22, 2002.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,394,412 B2
DATED : May 28, 2002
INVENTOR(S) : Zakai et al.

It is certified that error appears in the above-identified patent and that said Letters Patent is hereby corrected as shown below:

Title page, Item [54] and Column 1, line 1,
Title, should read -- HYDRAULIC DIAPHRAGM VALVE --

Title page,
Insert item -- [30] Foreign Application Priority Data
        Apr 23, 1993    [IL]    Israel    105277
        Oct. 24, 1993   [IL]    Israel    107447 --.
Item [57], ABSTRACT,
Line 18, "seating" should read -- sealing --.

Column 4,
Line 2, "portion" should read -- partition --.

Column 6,
Line 46, "22" should read -- 232 --.

Column 7,
Line 17, "ti" should read -- it --.
Line 57, "328" should read -- 320 --.

Column 8,
Line 60, "351" should read -- 352 --.

Column 9,
Line 59, "350" should read -- 330 --.

Column 10,
Line 21, "parts" should read -- ports --.
Line 36, "these" should read -- there --.
Line 49, "FIG" should read -- FIGS --.
Line 61, after "flow" and before "402", insert therein -- outlet --.

Column 11,
Line 13, before "314" insert therein -- inlet --.
Line 15, "385" should read -- 395 --.
Line 19, "348" should read -- 346 --.

UNITED STATES PATENT AND TRADEMARK OFFICE
CERTIFICATE OF CORRECTION

PATENT NO. : 6,394,412 B2
DATED : May 28, 2002
INVENTOR(S) : Zakai et al.

It is certified that error appears in the above-identified patent and that said Letters Patent is hereby corrected as shown below:

Column 12,
Line 32, "responsive" should read -- respective --.
Line 33, "this" should read -- their --.
Line 62, "left" should read -- leaf --.

Column 13,
Line 22, "double" should read -- diode --.

Column 14,
Line 42, "charge" should read -- charges --.
Lines 46-47, "scaled static" should read -- sealed state --.

Column 15,
Line 2, "hanging" should read -- changing --.

Column 16,
Line 25, "settings" should read -- seatings --.
Line 51, "enclosure" should read -- enclosures --.

This certificate supersedes Certificate of Correction issued October 28, 2003.

Signed and Sealed this

Twenty-fifth Day of November, 2003

JAMES E. ROGAN
*Director of the United States Patent and Trademark Office*